US008639266B2

(12) United States Patent
Zelinka

(10) Patent No.: US 8,639,266 B2
(45) Date of Patent: Jan. 28, 2014

(54) USING PEER DEVICES TO LOCATE A MOBILE DEVICE

(75) Inventor: Stephen David Zelinka, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/450,029

(22) Filed: Apr. 18, 2012

(65) Prior Publication Data

US 2013/0281110 A1 Oct. 24, 2013

(51) Int. Cl.
*H04W 24/00* (2009.01)
(52) U.S. Cl.
USPC .......... 455/456.1; 455/404.1; 455/414.2; 455/456.2; 455/456.3; 455/456.4; 455/456.5; 455/456.6

(58) Field of Classification Search
USPC .......... 455/456.1–456.6, 552.1, 553.1, 404.1, 455/414.2
See application file for complete search history.

(56) References Cited

U.S. PATENT DOCUMENTS

| 6,618,005 B2 | 9/2003 | Hannah et al. | |
|---|---|---|---|
| 2007/0129082 A1* | 6/2007 | Thacher | 455/456.1 |
| 2008/0161011 A1 | 7/2008 | Babin et al. | |
| 2008/0188242 A1 | 8/2008 | Carlson et al. | |
| 2009/0085806 A1 | 4/2009 | Piersol et al. | |
| 2009/0088182 A1 | 4/2009 | Piersol et al. | |
| 2009/0088183 A1 | 4/2009 | Piersol et al. | |
| 2009/0209268 A1* | 8/2009 | Ha et al. | 455/456.1 |
| 2010/0014443 A1 | 1/2010 | Cristian et al. | |
| 2010/0015999 A1 | 1/2010 | Belz et al. | |
| 2010/0246405 A1 | 9/2010 | Potkonjak | |
| 2010/0309051 A1 | 12/2010 | Moshfeghi | |
| 2011/0111726 A1* | 5/2011 | Kholaif et al. | 455/404.2 |
| 2011/0143776 A1 | 6/2011 | Shankaranarayanan et al. | |
| 2011/0159862 A1* | 6/2011 | Jackson | 455/418 |
| 2012/0030470 A1* | 2/2012 | Jdanov et al. | 713/176 |

FOREIGN PATENT DOCUMENTS

| EP | 2 192 811 | 6/2010 |
|---|---|---|
| WO | WO-01/27649 A1 | 4/2001 |
| WO | WO-01/58098 A2 | 8/2001 |
| WO | WO-2006/014439 | 2/2006 |

OTHER PUBLICATIONS rc3.org Rafe Colburn on Software Development (and other topics) "How Apple Uses Crowd-Sourcing to Find Your Location", 2011. Retrieved from the Internet on Apr. 18, 2012: http://rc3.org/2011/04/27/how-apple-uses-crowd-sourcing-to-find-your-location/.

(Continued)

*Primary Examiner* — Charles Appiah
*Assistant Examiner* — Edward Zhang
(74) *Attorney, Agent, or Firm* — Marshall, Gerstein & Borun LLP

(57) ABSTRACT

To determine the location of a querying mobile device, a request is received from the querying mobile device via a communication network. One or several participating mobile devices that potentially are physically proximate to the querying mobile device are identified. A request to scan for a location broadcast message transmitted by the querying mobile device is sent to the participating mobile devices. One or more location broadcast reports from participating mobile devices are received, where each received location broadcast report indicates that the location broadcast message was received at the corresponding participating mobile device. The location of the querying mobile device is estimated based on (i) the received one or more location broadcast reports and (ii) respective locations of the participating mobile devices from which the one or more location broadcast reports were received.

18 Claims, 19 Drawing Sheets

(56) References Cited

OTHER PUBLICATIONS

Apple Press Info "Apple Q&A on Location Data", 2011. Retrieved from the Internet on Apr. 18, 2012: http://www.apple.com/pr/library/2011/04/27Apple-Q-A-on-Location-Data.html.

Mobile Marketing Watch "Google Using Mobile Apps to Crowdsource a Massive Database of WiFi Hot Spots", 2010. Retrieved from the Internet on Apr. 18, 2012: http://www.mobilemarketingwatch.com/google-using-mobile-apps-to-crowdsource-a-massive-database-of-wifi-hot-spots-7659/.

GPS for Today "GPS Tracking for the Rest of Us". Cell Phone GPS Tracking, 2009. Retrieved from the Internet on Apr. 18, 2012: http://www.gpsfortoday.com/cell-phone-gps-tracking/.

Ekahau—A Free Mapping Wireless Surveying Tool (Video). Retrieved from the Internet on Apr. 18, 2012: http://www.youtube.com/watch?v=h2J64eVq-gw&feature=related.

Free Wireless Site Survey Software for Mac OS X (Video). Retrieved from the Internet on Apr. 18, 2012: http://www.youtube.com/watch?v=dU3Ge-GOC4M.

Meraki—"WiFi Mapper", 2012. Retrieved from the Internet on Apr. 18, 2012: http://www.meraki.com/products/wireless/wifi-mapper#faq:what_is_wifi_mapper.

International Search Report and Written Opinion for Application No. PCT/US2013/035710, dated Jul. 26, 2013.

\* cited by examiner

USING PEER DEVICES TO LOCATE A MOBILE DEVICE

FIELD OF THE DISCLOSURE

The present disclosure relates to locating a mobile device, and more specifically to locating a mobile device using other, participating mobile devices.

BACKGROUND

The background description provided herein is for the purpose of generally presenting the context of the disclosure. Work of the presently named inventors, to the extent that work is described in this background section, as well as aspects of the description that may not otherwise qualify as prior art at the time of filing, are neither expressly nor impliedly admitted as prior art against the present disclosure.

Today, many mobile devices (smartphones, tablet personal computers, etc.) are capable of determining their location using one or more of various locating techniques. For example, some mobile devices are equipped with a Global Positioning System (GPS) chip to determine the latitude, longitude, and elevation of the mobile device based on signals received from several GPS satellites. Some mobile devices are instead (or additionally) capable of determining their location using signals from fixed or semi-fixed terrestrial elements having known locations, such as fixed cellular infrastructure elements (e.g., cellular tower base stations), WiFi access points (APs) or "hotspots," etc. These locating techniques based on fixed or semi-fixed terrestrial elements may be useful if other techniques such as GPS are unavailable. For example, signals from WiFi APs may be used to locate a mobile device when the mobile device is indoors and unable to receive a GPS signal, or does not include a GPS chip.

Relying on fixed or semi-fixed terrestrial elements such as WiFi APs to locate a mobile device suffers from various drawbacks. For example, locating techniques may become less accurate when relying on APs that have been relocated or shut down, and may fail to take advantage of relatively new APs for which no location is yet known to a locating system.

SUMMARY

In one implementation, a method is for automatically determining location of a querying mobile device, where the querying mobile device and several mobile devices operate in a communication network. The method includes electronically receiving, via the communication network, a request from the querying mobile device to determine a location of the querying mobile device. The method also includes automatically identifying, from among the mobile devices, one or more participating mobile devices that potentially are physically proximate to the querying mobile device, where the participating mobile devices are configured to participate in determining location of the querying mobile device. The method further includes electronically transmitting, to the one or more participating mobile devices via the communication network, a request to scan for a location broadcast message transmitted by the querying mobile device, electronically receiving one or more location broadcast reports from the one or more participating mobile devices, where each received location broadcast report is indicative of the location broadcast message received at a corresponding participating mobile device, and automatically estimating the location of the querying mobile device based on (i) the received one or more location broadcast reports and (ii) respective locations of the participating mobile devices from which the one or more location broadcast reports were received.

In another implementation, a location provider system is configured to couple to a communication network in which a querying mobile device and several participating mobile devices operate. The location provider system includes a participant identification module and a location determination module. The participant identification module is configured to receive a request from the querying mobile device to determine a location of the querying mobile device, identify one or more of the plurality of participating mobile devices that potentially are physically proximate to the querying mobile device, and send, to each of the one or more participating mobile devices via the communication network, a request to scan for a location broadcast message transmitted by the querying mobile device. The location determination module is configured to receive one or more location broadcast reports from the one or more participating mobile devices, where each received location broadcast report is indicative of the location broadcast message received at a corresponding participating mobile device, and estimate a location of the querying mobile device based on the received one or more location broadcast reports and on respective locations of the participating mobile devices from which the one or more location broadcast reports were received.

In another implementation, a method is in a mobile device for determining location of the mobile device, where the mobile device is configured to operate in a first communication network and a second communication network. The method includes generating a request to determine a location of the mobile device, transmitting the request to a location provider system via the first communication network, transmitting a location broadcast message via the second communication network, where the location broadcast message includes an identifier of the mobile device, and, in response to the transmitted location broadcast message, receiving, from the location provider system via the first communication network, an estimated location of the mobile device, where the estimated location is based on locations of devices in the second communication network that received the location broadcast message.

According to another implementation, a mobile device is configured to operate in a first communication network and a second communication network. The mobile device includes a location crowdsourcing module configured to generate a request to determine a location of the mobile device, cause the request to be transmitted to a location provider system via the first communication network, generate a location broadcast message that includes an identifier of the mobile device, cause the location broadcast message to be transmitted via the second communication network, and receive, from the location provider system via the first communication network, an estimated location of the mobile device in response to the generated location broadcast message.

In still another implementation, a method is in a mobile device for assisting in determining a location of a querying mobile device, where the mobile device is configured to operate in a first communication network and a second communication network. The method includes scanning for location broadcast messages transmitted via the second communication network and receiving a location broadcast message from a querying mobile device via the second communication network, where the location broadcast message includes an identifier of the querying mobile device. The method also includes, in response to receiving the location broadcast message, generating a location broadcast report corresponding to the received location broadcast message, and transmitting the location broadcast report to a location provider system via the first communication network for determining the location of the querying mobile device.

According to another implementation, a mobile device is configured to operate in a first communication network and a second communication network. The mobile device includes a location assistance module configured to scan for a location broadcast message transmitted via the second communication network. The location assistance module is also configured to receive, from a querying mobile device via the second communication network, the location broadcast message, where the location broadcast message includes an identifier of the querying mobile device. Further, the location assistance module is configured to generate a report based on the received location broadcast message and cause the report to be transmitted to the location provider system via the first communication network.

DETAILED DESCRIPTION

In embodiments described below, a mobile device requesting its location (i.e., a "querying" mobile device) is assisted by one or more other, "participating" mobile devices having known or easily ascertainable locations. Generally speaking, the mobile device broadcasts a message which the participating mobile devices receive or, conversely, the participating mobile devices transmit messages which the mobile device receives. The location of the mobile device then can be determined using the locations of the participating mobile devices and the received message or messages. The participating mobile devices may be nearby mobile devices of users who have agreed to participate in locating querying mobile devices via the disclosed techniques, for example, which are referred to below as "crowdsourcing" techniques. It will be understood, however, that users who have agreed to participate in location determination need not perform any manual tasks to assist in locating a querying mobile device. Rather, mobile devices of the corresponding users contribute information for locating the querying mobile device. In some implementations, a location provider system (e.g., one or more servers providing a web-accessible service) also assists in locating the querying mobile device by identifying nearby participating mobile devices, synchronizing operations of querying and/or participating mobile devices, and/or performing calculations necessary to estimate a location of the querying mobile device.

Several examples of suitable techniques are discussed below. More specifically, according to the first example technique discussed with reference to FIGS. 1-5, a querying mobile device transmits a location broadcast message, participating mobile devices are identified, some or all of the participating mobile devices receive the location broadcast message and generate corresponding reports, and the reports are used to determine the location of the querying mobile device. FIGS. 6-10 then illustrate a second technique according to which participating mobile devices are identified, the participating mobile devices transmit a location broadcast message, and a querying mobile device receives some or all of the transmitted location broadcast messages and generates a corresponding report. As another example, FIGS. 11-15 illustrates a third technique according to which a querying mobile device transmits a location broadcast message including a particular pattern, and some of the participating mobile device receive the location broadcast message and generate corresponding reports. As yet another example, a technique according to which a querying mobile device transmits a request, and participating mobile devices transmit location broadcast messages in response to the request, is discussed with reference to FIGS. 16-19.

Figure 1:
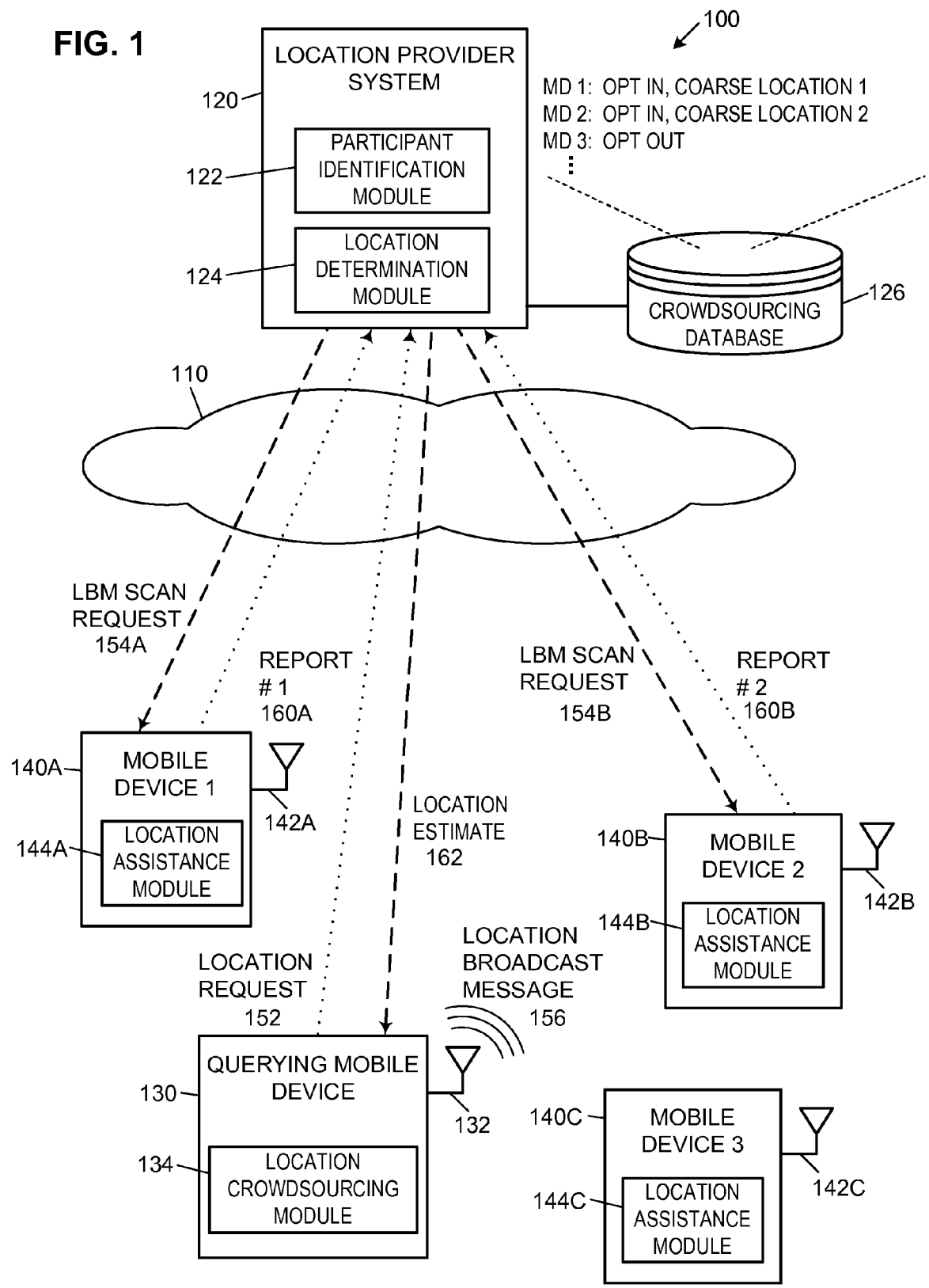
FIG. 1 is a block diagram of an example system that implements a "crowdsource" locating technique according to which a querying device transmits, and certain previously identified participating devices process, a location broadcast message.

FIG. 1 is a block diagram of a first example system 100 in which a first example technique for locating a mobile device using crowdsourcing is applied. The system 100 includes a communication network 110. Communication network 110 includes one or more sub-networks. For example, communication network 110 may include both a cellular network (e.g., including cell towers, etc.) and a wired or wireless Ethernet (e.g., including routers, bridges, etc.). A location provider system 120 is coupled to communication network 110. Location provider system 120 may include one or more computing devices (e.g., servers), and may reside at a single location or be distributed across multiple locations. Location provider system 120 includes a participant identification module 122 and a location determination module 124, and is coupled to a crowdsourcing database 126. In other embodiments, the crowdsourcing database 126 is included within location provider system 120.

The system 100 also includes a querying mobile device 130 that attempts to determine its own location according to the first example crowdsource locating technique of FIG. 1. Querying mobile device 130 includes at least one antenna 132 and a location crowdsourcing module 134. In addition to querying mobile device 130, the system 100 includes a plurality of other mobile devices 140. Each of mobile devices 140 includes at least one antenna 142 and a location assistance module 144. Each of mobile devices 140 may be the same as or different than the other mobile devices 140, and may be the same as or different than querying mobile device 130, according to various embodiments and scenarios.

Querying mobile device 130 and mobile devices 140 are each configured to operate in at least two different wireless communication networks using at least two different communication protocols. A first communication protocol is used for communications over a first communication network, and a second communication protocol is used for communications over a second communication network. In the embodiment shown in FIG. 1, for example, the first communication network may be a cellular network that is included in communication network 110, and the second communication network may be a shorter range network (e.g., a WiFi network) that includes querying mobile device 130 and mobile devices 140 but not communication network 110. Antenna 132 of querying mobile device 130 and antennas 142 of mobile devices 140 are used for communications in the second communication network. In some embodiments, antennas 132 and/or 142 are also used for communications in the first communication network. In other embodiments, other antennas (not shown) are used for communications in the first communication network. In some embodiments, one or more of querying mobile device 130 and mobile devices 140 are additionally configured to utilize locating services (e.g., GPS) that do not make use of the crowdsource locating techniques described herein.

According to various embodiments, each of the modules illustrated in the first example system 100 (e.g., the participant identification module 122, the location crowdsourcing module 134, etc.) is implemented in hardware, in a processor that executes firmware and/or software instructions, or a combination thereof.

In operation, the location crowdsourcing module 134 of querying mobile device 130 generates a request 152 to determine the location of querying mobile device 130, and causes the request 152 to be transmitted to location provider system 120 via the first (e.g., cellular) communication network. Location provider system 120 may be a web-accessible service, for example. In an embodiment, the request 152 includes information identifying querying mobile device 130 (e.g., a medium access control (MAC) address). Moreover, the request 152 may include information indicating a coarse location of querying mobile device 130. For example, in one embodiment where querying mobile device 130 includes another locating system or module (e.g., a GPS chip, etc.), the request 152 includes information indicating a last location that querying mobile device 130 had determined using the other locating system or module. As another example, the request 152 includes information indicating a last location that querying mobile device 130 had requested and received using the first example crowdsource locating technique described herein with reference to FIGS. 1 and 2.

In an embodiment, location provider system 120 receives the request 152 via communication network 110, and then passes the request 152 to the participant identification module 122. After receiving the request 152, the participant identification module 122 identifies one or more participating mobile devices that potentially are physically proximate to querying mobile device 130. In one embodiment, the identification process includes determining two characteristics of mobile devices: 1) whether a mobile device is a "participating" mobile device, and 2) whether a mobile device is potentially physically proximate to querying mobile device 130.

In some embodiments, the participant identification module 122 identifies which mobile devices are "participating" mobile devices based on which mobile devices are associated with an "opt in" status. A mobile device may have an "opt in" status, for example, if a user associated with the mobile device has indicated acceptance of an "opt in" agreement (e.g., by manually selecting an option to participate in the crowdsource locating service in exchange for the user being able to use the crowdsource locating service). In the example embodiment of FIG. 1, the participant identification module 122 identifies which mobile devices are participating mobile devices by accessing crowdsourcing database 126. More specifically, crowdsourcing database 126 may electronically store, on a computer-readable medium, a configuration record that indicates whether a particular user has opted in or out. In other embodiments, the participant identification module 122 instead (or additionally) identifies which mobile devices are "participating" mobile devices based on determined capabilities of the mobile devices (e.g., based on which mobile devices include a location assistance module similar to the location assistance module 144). Capabilities of mobile devices may also be stored in crowdsourcing database 126, for example.

In one embodiment, the participant identification module 122 identifies which mobile devices are potentially physically proximate to querying mobile device 130 by determining coarse locations associated with various mobile devices. For example, in one embodiment, the participant identification module 122 determines which mobile devices have an associated coarse location indicator that indicates a certain measure of proximity (or likely proximity) to querying mobile device 130. The proximity determination may be made by comparing coarse locations of the mobile devices to a coarse location of querying mobile device 130, for example (e.g., using coarse location information that corresponds to querying mobile device 130 and was included in the request 152). In the example embodiment of FIG. 1, the participant identification module 122 accesses coarse locations in crowd-sourcing database 126 to identify which mobile devices are potentially physically proximate to querying mobile device 130. In some embodiments, the participant identification module 122 only determines whether a particular mobile device may be proximate to querying mobile device 130 if the participant identification module 122 has already determined that the mobile device is a "participating" mobile device (e.g., has opted in, etc.). Conversely, in other embodiments, the participant identification module 122 only determines whether a particular mobile device is a "participating" mobile device if the participant identification module 122 has already determined that the mobile device is potentially physically proximate to querying mobile device 130.

In the example illustrated in FIG. 1, crowdsourcing database 126 stores information indicating that mobile devices 140A and 140B has an "opt in" status and are therefore "participating" mobile devices, and indicating that mobile device 140C has an "opt out" status and therefore is a "non-participating" mobile device. Moreover, crowdsourcing database 126 stores information indicating that participating mobile device 140A is associated with a first coarse location ("coarse location 1") and that mobile device 140B is associated with a second coarse location ("coarse location 2"). In the example scenario shown in FIG. 1, both coarse location 1 and coarse location 2 include information that the participant identification module 122 utilizes to identify both participating mobile device 140A and participating mobile device 140B as being potentially physically proximate to querying mobile device 130. For example, each coarse location may be an identification of a cell tower currently serving the respective mobile device 140, and the coarse location may be determined to be potentially proximate to querying mobile device 130 if the device 130 is currently served by the same cell tower (or a tower of a neighboring cell, etc., depending on the criteria used). As another example, each coarse location may be a recent past location of the respective mobile device 140 (e.g., as previously determined by a GPS system of the device, or as previously determined by location provider system 120 using the first example crowdsource locating technique of FIG. 1, etc.), and the coarse location may be determined to be potentially proximate to querying mobile device 130 if the coarse location is within a threshold distance of a cell tower currently serving querying mobile device 130. As another example, each coarse location may be a list of WiFi access points (APs) detected in a recent WiFi scan performed by the respective mobile device 140, and the coarse location may be determined to be potentially proximate to querying mobile device 130 if querying mobile device 130 detects at least a threshold number of the listed APs during a WiFi scan.

After identifying the participating mobile devices 140A and 140B, the participant identification module 122 causes location provider system 120 to transmit requests 154A and 154B to participating mobile devices 140A and 140B, respectively, via the first (e.g., cellular) communication network. Each of the requests 154 includes a message indicating that the receiving mobile device should scan for a location broadcast message on the second (e.g., WiFi) communication network. In some embodiments, each of the requests 154 also includes identifying information associated with an expected location broadcast message. In one embodiment, for example, each of the requests 154 includes a MAC address that participating mobile devices 140A and 140B can use to confirm that a detected location broadcast message is the expected location broadcast message (i.e., is associated with querying mobile device 130). Additionally or alternatively (e.g., in an implementation where location provider system 120 synchronizes operations of the locating system), each of the requests 154 may include a particular time at which the respective participating mobile device 140 is to listen for a location broadcast message.

In response to receiving one of requests 154 to scan for a location broadcast message, the location assistance modules 144 of participating mobile devices 140A and 140B scan for a location broadcast message transmitted via the second (e.g., WiFi) communication network. In some embodiments where the requests 154 include identifying information associated with an expected location broadcast message (e.g., a MAC address), the location assistance modules 144 scan for a location broadcast message that includes the identifying information. In some embodiments where the requests 154 include a time at which the location broadcast message is expected, the location assistance modules 144 scan for a location broadcast message at the specified time.

The location crowdsourcing module 134 of querying mobile device 130 generates a location broadcast message 156, and causes the location broadcast message 156 to be transmitted (broadcast) via the second communication network using antenna 132. In some implementations (e.g., where location provider system 120 synchronizes operations of the locating system), location provider system 120 may send a message (not shown in FIG. 1) to querying mobile device 130 that includes a particular time, and querying mobile device 130 may transmit the location broadcast message 156 at the specified time. The specified time may correspond to a time that is sufficiently far in the future to account for latencies in message delivery (e.g., due to mobile phones often being in sleep mode, etc.). For example, both the requests 154 and a message sent to querying mobile device 130 may specify a single future time at which both 1) querying mobile device 130 is to begin transmitting the location broadcast message 156, and 2) participating mobile devices 140A and 140B are to begin listening for a location broadcast message. In an embodiment where the second communication network is a WiFi network, the location crowdsourcing module 134 automatically configures querying mobile device 130 as a temporary WiFi AP or "hotspot" in order to transmit the location broadcast message 156. In some implementations, the location broadcast message 156 is simply a beacon that querying mobile device 130 automatically broadcasts when configured as a WiFi hotspot.

The location broadcast message 156 includes an identifier of querying mobile device 130. For example, in some embodiments, a MAC address of querying mobile device 130 is included in location broadcast message 156. In some of these embodiments, location provider system 120 initially generates the MAC address, and/or causes the MAC address to be transmitted to querying mobile device 130, in response to receiving the request 152 from the querying mobile device 130. Querying mobile device 130 may then include the assigned MAC address in the location broadcast message 156. In this manner, location provider system 120 can protect the privacy of querying mobile device 130. For example, location provider system 120 may ensure that different (e.g., suitably random) MAC addresses are assigned to a querying mobile device each time the device attempts to be located, so that no querying mobile devices can be tracked over time based on broadcast MAC addresses.

In the example embodiment and scenario of FIG. 1, participating mobile devices 140A and 140B receive the location broadcast message 156 from querying mobile device 130 via the second communication network (e.g., using network interfaces of participating mobile devices 140A and 140B), and pass the location broadcast message 156 to the respective location assistance modules 144A and 144B. After receiving the location broadcast message 156, each of location assistance modules 144 generates a respective report 160 based on the location broadcast message 156, and causes the report 160 to be transmitted to location provider system 120 via the first communication network. In various embodiments, each of the reports 160 includes a location of the respective participating mobile device 140, an indication of a signal strength of the location broadcast message 156 as received by the respective participating mobile device 140A or 140B, and/or an identifier of the respective participating mobile device 140A or 140B. For example, in an embodiment, report 160A includes a location of participating mobile device 140A as determined by a GPS system included in participating mobile device 140A, and report 160B includes a location of participating mobile device 140B as determined by a GPS system included in participating mobile device 140B. As another example, in an embodiment, report 160A also includes an indication of a received signal strength (e.g., power level) measured by a receiver of participating mobile device 140A, and report 160B also includes an indication of a received signal strength measured by a receiver of participating mobile device 140B. As yet another example, in an embodiment, report 160A also includes a temporary MAC address of participating mobile device 140A, and report 160B also includes a temporary MAC address of participating mobile device 140B.

Each report 160 may also include the identifier (e.g., MAC address) of querying mobile device 130 that was included in the location broadcast message 156. In some implementations, the participating mobile devices 140A and 140B are not aware that the identifier corresponds to a querying mobile device. For example, the participating mobile devices 140A and 140B may, in response to requests 154, simply listen for and report to location provider system 120 all signals detected from WiFi hotspots, and location provider system 120 may then determine which information (e.g., which RSSI, etc.) corresponds to querying mobile device 130. In this way, querying mobile device 130 may be afforded an additional measure of privacy. Conversely, in other implementations, participating mobile devices 140A and 140B may be aware of the identifier (e.g., a temporarily-assigned MAC address) of querying mobile device 130. In these latter implementations, participating mobile devices 140A and 140B may report only the relevant information to location provider system 120. Moreover, in these latter implementations, participating mobile devices 140A and 140B may perform operations other than generating signal strength metrics, such as sending one or more probes to querying mobile device 130 and receiving one or more responses. By measuring the probe/response round trip propagation time (or an average propagation time, etc.), the distance from querying mobile device 130 to the respective participating mobile device 140 may be estimated. Such distance estimates could replace the signal strength indicators in reports 160, for example.

Location provider system 120 receives the reports 160A and 160B from participating mobile devices 140A and 140B, respectively, via communication network 110, and passes the reports 160 to the location determination module 124. After receiving the reports 160, the location determination module 124 determines an estimated location 162 of querying mobile device 130 based on the received reports 160 and known locations of participating mobile devices 140A and 140B.

In one embodiment, information indicating the known locations of participating mobile devices 140A and 140B is included in the reports 160A and 160B, respectively. In this embodiment, the location determination module 124 may determine the known locations directly from the received reports 160. In another embodiment, the location determination module 124 retrieves the known locations of participating mobile devices 140A and 140B from a database (e.g., the crowdsourcing database 126). For example, in one embodiment where each report 160 includes identification information corresponding to the mobile device 140 that transmitted the report 160, the location determination module 124 retrieves the known locations from a database using the identification information (e.g., as a key to an index in the database).

Any of various techniques may be used by the location determination module 124 to determine the estimated location 162 based on information in the reports 160. While the example scenario illustrated in FIG. 1 shows only two participating mobile devices contributing to the crowdsourcing location technique, fewer or more than two participating mobile devices may contribute in other scenarios. For example, one of participating mobile devices 140A and 140B may be identified by participant identification module 122 as being potentially physically proximate to querying mobile device 130, but may fail to detect the location broadcast message 156 and therefore fail to send a report 160 to location provider system 120. As another example, mobile device 140A may instead be determined by participant identification module 122 to have an "opt in" status and to be potentially physically proximate to querying mobile device 130, and therefore (if location broadcast message 156 is detected) may also send a report 160 to location provider system 120. In one embodiment and scenario where three or more participating mobile devices are identified by the participant identification module 122 and successfully detect the location broadcast message 156, triangulation or trilateration may be used to determine the estimated location 162 of querying mobile device 130.

Once the location determination module 124 has estimated the location, location provider system 120 may transmit the estimated location 162 to querying mobile device 130 via the first communication network. Querying mobile device 130 may then receive the estimated location 162, and pass the estimated location 162 to the location crowdsourcing module 134. After the location crowdsourcing module 134 receives the estimated location 162, the location crowdsourcing module 134 may utilize the estimated location 162 in some manner. For example, the location crowdsourcing module 134 may cause the estimated location 162 to be displayed to a user of querying mobile device 130, shared with another application running on querying mobile device 130, stored in a memory of querying mobile device 130, etc.

Figure 2:
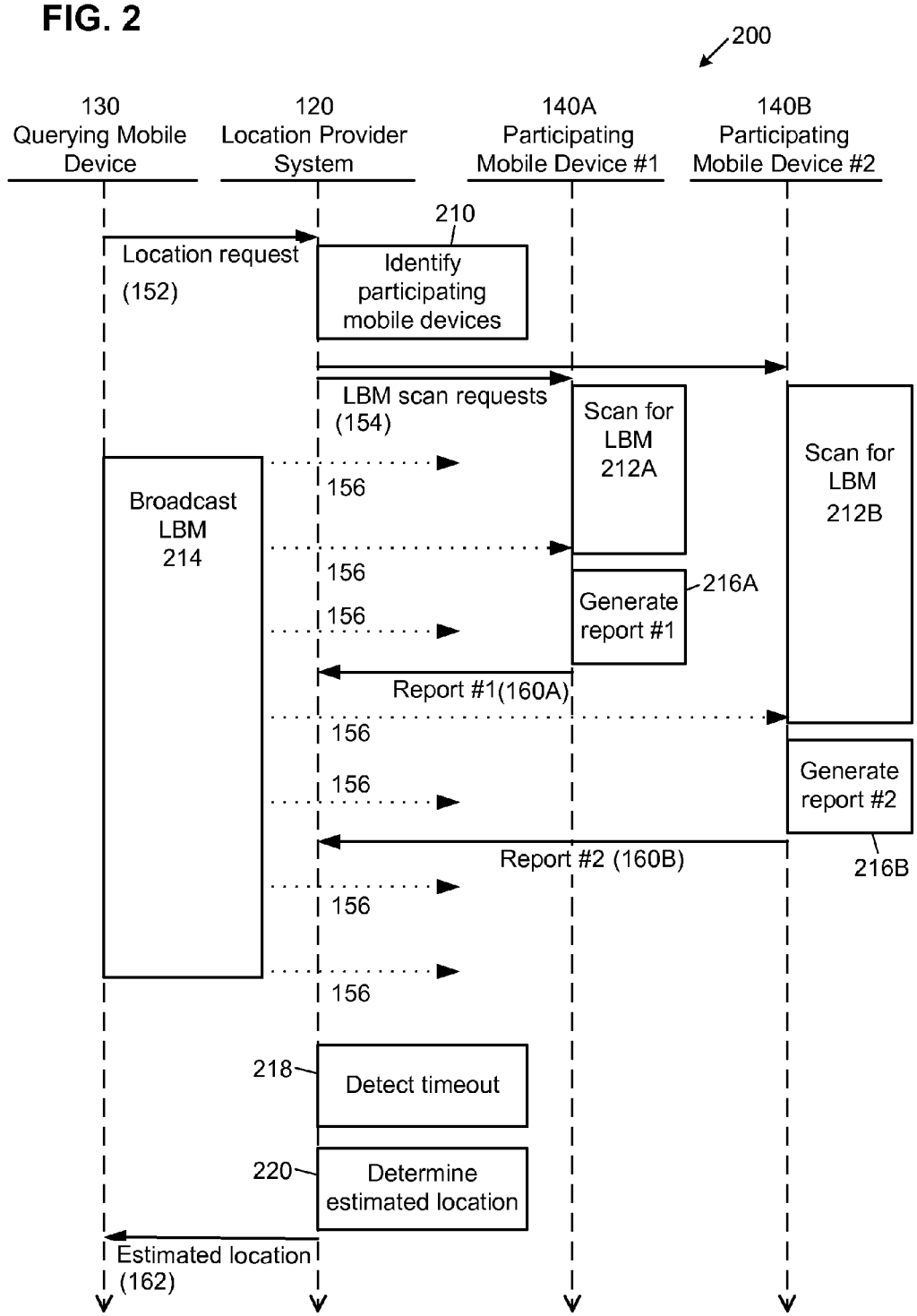
FIG. 2 is a sequence diagram corresponding to the example system and crowdsource locating technique of FIG. 1.

FIG. 2 is a sequence diagram 200 corresponding to the first example system 100 and first example crowdsource locating technique of FIG. 1. The sequence diagram 200 includes a first time-line corresponding to querying mobile device 130 of FIG. 1, a second time-line corresponding to location provider system 120 of FIG. 1, a third time-line corresponding to participating mobile device 140A of FIG. 1, and a fourth time-line corresponding to participating mobile device 140B of FIG. 1. Solid horizontal lines in FIG. 2 represent communications via a first communication network (e.g., via a cellular network in communication network 110 of FIG. 1), and dotted horizontal lines in FIG. 2 represent communications via a second communication network (e.g., a WiFi network). The sequence diagram 200 is described below with reference to both FIG. 1 and FIG. 2.

Initially, the request 152 is transmitted from querying mobile device 130 to location provider system 120 via the first (e.g., cellular) communication network. Location provider system 120 then (e.g., in response to receiving the request 152) performs a process 210 of identifying participating mobile devices that may be physically proximate to querying mobile device 130. After process 210 is completed, location provider system 120 transmits a request 154 to scan for a location broadcast message to each of the participating mobile devices identified in process 210. In the scenario of FIGS. 1 and 2, participating mobile devices 140A and 140B are identified by process 210.

After receiving a respective one of the requests 154, participating mobile devices 140A and 140B each begin a scan 212 for a location broadcast message. In some implementations, each request 154 includes a particular time, and each of the scans 212 begins at the time specified in the requests 154. In some embodiments and scenarios, one or more of the requests 154 are sent before the process 210 has completed, and/or scans 212A and 212B do not begin at the same time. For example, in one embodiment and scenario, request 154A is transmitted at a first time when participating mobile device 140A is identified, and request 154B is transmitted at a later, second time when participating mobile device 140B is identified. The scan 212A may then begin before scan 212B begins, for example.

After transmitting the request 152, querying mobile device 130 begins a mode of operation 214 (e.g., operation as a WiFi hotspot) and transmits the location broadcast message 156 via the second communication network. In some embodiments, querying mobile device 130 begins transmitting location broadcast message 156 in mode 214 after a suitable, predetermined amount of time has expired after transmitting the request 152. To this end, a suitable timeout may be utilized such that location provider system 120 has sufficient time to transmit requests 154 to any participating mobile devices before location broadcast message 156 is first sent, thereby avoiding wasted broadcasts from querying mobile device 130. In other embodiments, querying mobile device 130 does not initiate mode 214 until receiving a message (not shown in FIG. 2) from location provider system 120 indicating that the identification process 210 has been completed and/or requests 154 have been sent. In still other embodiments, querying mobile device 130 does not initiate mode 214 and begin broadcasting until a time indicated in a message received from location provider system 120, in order to provide synchronization among all devices.

The location broadcast message 156 may be transmitted periodically, as shown in FIG. 2. In the example scenario shown in FIG. 2, the second transmission of location broadcast message 156 is successfully detected by participating mobile device 140A and the fourth transmission of location broadcast message 156 is successfully detected by participating mobile device 140B. In one embodiment, the location broadcast message 156 is repeated only a predetermined number of times, or only until a timeout expires. In other embodiments, the location broadcast message 156 is repeated until querying mobile device 130 receives the estimated location 162 from location provider system 120. In still other embodiments, the location broadcast message 156 is repeated until the earlier of 1) receiving the estimated location 162 and 2) detecting a timeout expiration (or reaching a predetermined number of repetitions). In other embodiments, the location broadcast message 156 is only sent once, or sent repeatedly but in a non-periodic manner.

In an embodiment, each of scans 212 terminates in response to the location broadcast message 156 having been received by the respective participating mobile device 140A or 140B. In some embodiments, each of scans 212 terminates in response to the earlier of 1) reception of the location broadcast message 156 and 2) expiration of a suitable timeout period.

After the location broadcast message 156 has been received by participating mobile devices 140A and 140B, the devices 140A and 140B generate reports 160A and 160B (processes 216A and 216B), respectively. Once the reports 160 are generated, participating mobile device 140A transmits the report 160A, and participating mobile device 140B transmits the report 160B, to location provider system 120 via the first (e.g., cellular) communication network.

After the expiration of a suitable timeout has been detected (process 218), location provider system 120 determines the estimated location 162 (process 220), and the estimated location 162 is transmitted to querying mobile device 130 via the first communication network. In an alternative embodiment, process 218 may be omitted from sequence diagram 200. For example, process 218 is omitted in an embodiment where location provider system 120 does not determine the estimated location 162 (at process 220) until all participating mobile devices identified in process 210 have reported. In another alternative embodiment, location provider system 120 does not determine the estimated location 162 (at process 220) until the earlier of 1) the expiration of a suitable timeout period and 2) reception of a report from each of the participating mobile devices identified in process 210. In this latter embodiment, for example, location provider system 120 could begin process 220 as soon as the report 160B is received from participating mobile device 140B, without waiting for the timeout to expire. In yet another alternative embodiment, location provider system 120 does not determine the estimated location 162 (at process 220) until the number of reports received exceeds a suitable, predetermined threshold.

Figure 3:
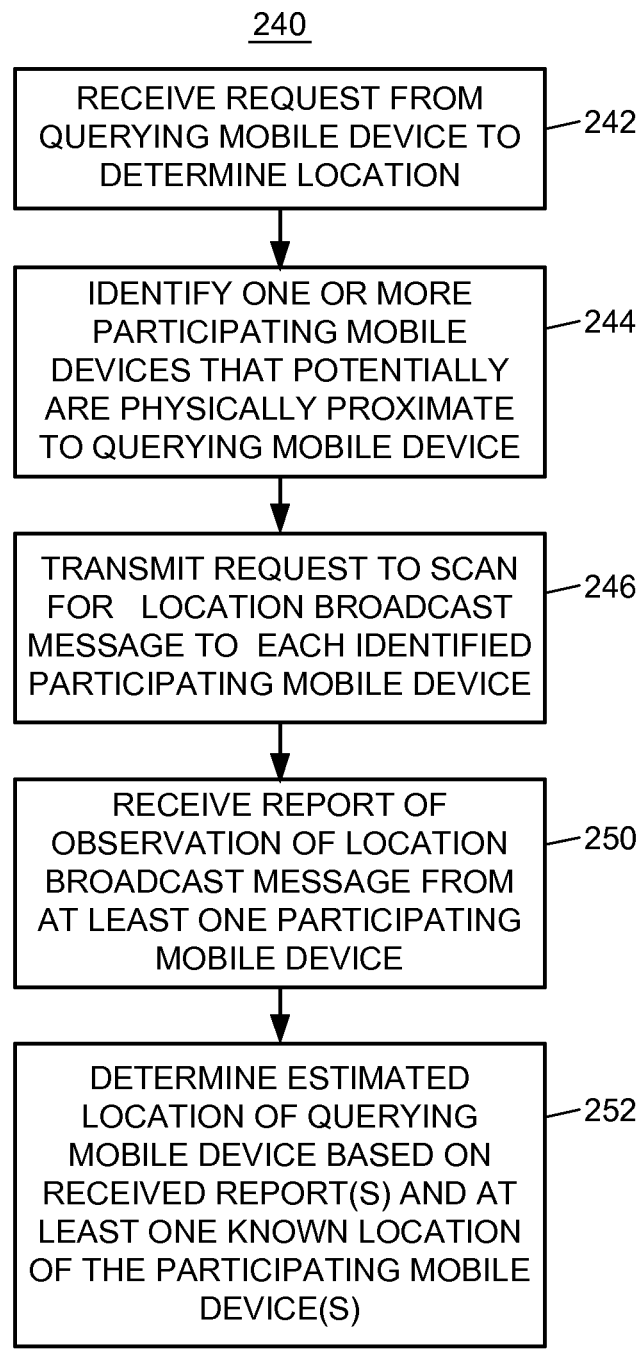
FIG. 3 is a flow diagram of an example method for locating a mobile device using crowdsourcing that may be implemented in a location provider system within the example system of FIG. 1.

FIG. 3 is a flow diagram of an example method 240 for locating a mobile device using crowdsourcing that may be implemented in a location provider system, such as location provider system 120 in the first example system 100 of FIG. 1.

At block 242, a request to determine a location of a querying mobile device is received from the querying mobile device (e.g., querying mobile device 130 in FIG. 1). The request to determine location is received via a wireless communication network such as a cellular network. In various embodiments, the request to determine location includes a coarse location of the querying mobile device, and/or an identifier of the querying mobile device (e.g., a MAC address).

At block 244, one or more participating mobile devices that potentially are physically proximate to the querying mobile device (e.g., similar to participating mobile devices 140A and 140B in FIG. 1) are identified. In an embodiment, identifying the potentially physically proximate mobile devices includes accessing coarse locations of the participating mobile devices that are stored in a database, and comparing those coarse locations to a coarse location of the querying mobile device (e.g., using coarse location information included in the request to determine location received at block 242). In some embodiments, the coarse location of the querying mobile device is a past known location of the querying mobile device, and/or an identifier of a cellular tower currently associated with the querying mobile device.

In some embodiments, the identified mobile devices are mobile devices that are associated with a respective prior manual selection of an option to participate in locating querying mobile devices, and therefore have an "opt in" status. For example, a mobile device may be a "participating" mobile device if a user associated with the mobile device indicates acceptance of a location crowdsourcing agreement (e.g., an agreement allowing the user's mobile device to be used for location crowdsourcing in exchange for the user's mobile device being permitted to access the location crowdsourcing service).

In some embodiments, identifying the potentially physically proximate mobile devices includes determining whether mobile devices may participate in locating the querying mobile device based on one or more additional conditions. As one example condition, a first mobile device can only assist in locating a second mobile device if the first and second mobile devices are linked according to a predetermined mapping of mobile devices, in some embodiments. For example, in an embodiment, a first mobile device can only assist in locating a second mobile device if the second mobile device is associated with one or more particular organizations (e.g., the same organization(s) as the first mobile device). As another example, in an embodiment, a first mobile device can only assist in locating a second mobile device if the second mobile device is associated with one or more particular social networks (e.g., the same social network(s) as the first mobile device).

As another example condition, a first mobile device can only assist in locating a second mobile device if the first mobile device is within (or outside of) a particular geographic area (e.g., is located outside of a restricted area), in an embodiment. As yet another example condition, a first mobile device can only assist in locating a second mobile device if a determined time is within a particular time range (e.g., if it is determined that the current time is within a time range that a user of the mobile device has indicated as being allowable for participation in location crowdsourcing), in an embodiment. As still another example condition, in an embodiment, a first mobile device can only assist in locating a second mobile device if a battery level of the first mobile device is above a particular threshold (e.g., to ensure that location crowdsourcing does not overly tax the power supplies of "opted in" mobile devices). As still another example condition, in an embodiment, a first mobile device can only assist in locating a second mobile device if the first mobile device is not otherwise occupied (e.g., is not being used by an owner of the device, or any other suitable criteria). As still another example condition, in an embodiment, a first mobile device can only assist in locating a second mobile device if the first mobile device has been utilized for location crowdsourcing less than a threshold number of times in the current hour, day, week, etc. In some embodiments, identifying the potentially physically proximate mobile devices at block 244 includes determining whether two or more of the above conditions are satisfied, and/or includes determining whether other conditions not described above are satisfied. In some embodiments, the one or more conditions correspond to one or more options that were previously and manually selected by users associated with the (potentially) participating mobile devices.

At block 246, a request to scan for a location broadcast message is transmitted to each participating mobile device that was identified at block 244 as potentially being near to the querying mobile device. The request to scan is transmitted via a communication network such as a cellular network (e.g., the same network over which the request to determine location is received at block 242).

At block 250, a report of an observation of a location broadcast message is received from at least one of the participating mobile devices that was sent a request to scan at block 246. The one or more reports are received via a communication network such as a cellular network (e.g., the same network over which the request to determine location is received at block 242 and the request to scan is transmitted at block 246). In various embodiments, each report received at block 250 includes a known location of the participating mobile device that sent the report, and/or information identifying the participating mobile device that sent the report.

At block 252, an estimated location of the querying mobile device is determined based on the report(s) received from the one or more participating mobile devices at block 250, and based on known locations corresponding to each of those participating mobile devices. In some embodiments, the known locations are determined directly from information included in the reports received at block 250. In other embodiments, the known locations are retrieved from a database by a location provider system implementing the method 240, based on mobile device identification information included in the reports received at block 250. The estimated location may be determined in any of various ways. In some embodiments, for example, the estimated location is determined using triangulation or trilateration.

In some embodiments, additional blocks not shown in FIG. 3 are included in the method 240. For example, in one embodiment, the method 240 further includes a block in which the estimated location determined at block 252 is transmitted to the querying mobile device. In this embodiment, the estimated location is transmitted to the querying mobile device via a communication network such as a cellular network (e.g., the same network over which the request to determine location is received at block 242, the request to scan is transmitted at block 246, and the report(s) is/are received at block 250). Moreover, in some embodiments, the blocks shown in FIG. 3 do not occur in their entirety in the order shown. For example, in one embodiment, blocks 244, 246, and 250 may occur at least in part simultaneously (e.g., a first request to scan may be transmitted to a first participating mobile device before a second participating mobile device has been identified, a first report may be received before a second request to scan has been transmitted, etc.).

Figure 4:
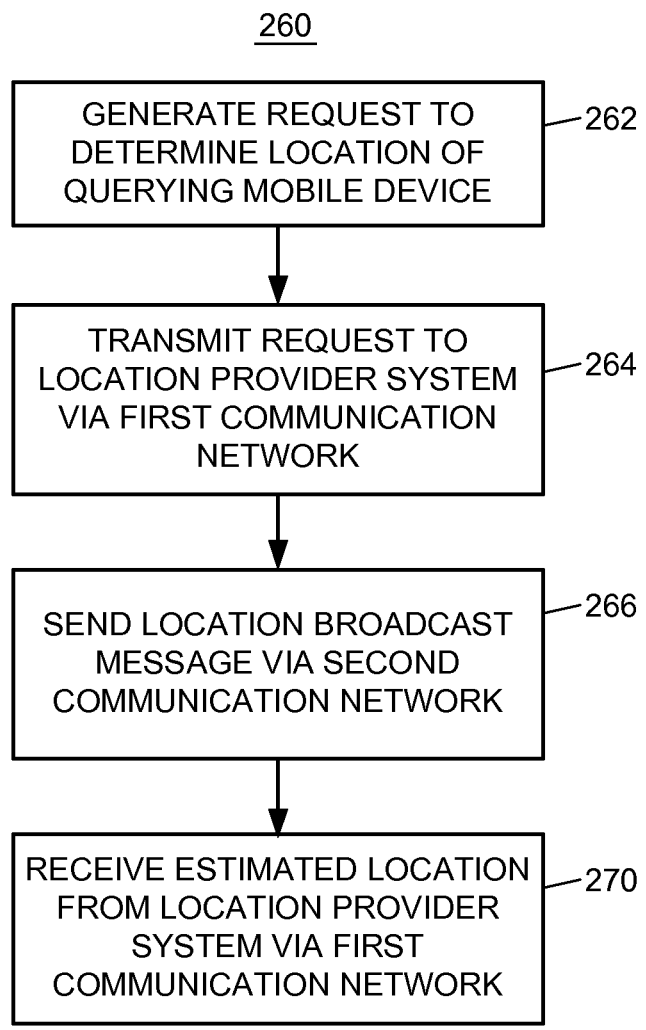
FIG. 4 is a flow diagram of an example method for locating a mobile device using crowdsourcing that may be implemented in a querying mobile device within the example system of FIG. 1.

FIG. 4 is a flow diagram of an example method 260 for locating a mobile device using crowdsourcing that may be implemented in a querying mobile device, such as querying mobile device 130 in the first example system 100 of FIG. 1. The querying mobile device is capable of operating in at least a first communication network and a second communication network. For example, the querying mobile device may be capable of operating in a first, cellular network and a second, WiFi network.

At block 262, a request to determine a location of the querying mobile device implementing the method 260 is generated. In various embodiments, the request to determine location includes a coarse location estimate of the querying mobile device (e.g., a previously determined location, etc.), and/or an identifier of the querying mobile device. At block 264, the request generated at block 262 is transmitted to a location provider system (e.g., location provider system 120 in FIG. 1) via the first communication network.

At block 266, a location broadcast message is sent via the second communication network. In some embodiments, sending the location broadcast message includes the querying mobile device automatically configuring itself as a WiFi hotspot. The location broadcast message includes an identifier of the querying mobile device. For example, the location broadcast message may include a permanent MAC address of the querying mobile device. Alternatively, the location broadcast message may include a temporary MAC address assigned to the querying mobile device by the location provider system for purposes of locating the querying mobile device. The identifier may be used by participating mobile devices to identify a received broadcast message as the expected location broadcast message, for example. In one embodiment, the location broadcast message is sent repeatedly (e.g., periodically). The location broadcast message may be a WiFi beacon, for example. In another embodiment, the location broadcast message is sent only once.

At block 270, an estimated location of the querying mobile device is received from the location provider system via the first communication network. In an embodiment, the estimated location is a location determined by the location provider system based on reports from one or more participating mobile devices that received the location broadcast message sent at block 266.

In some embodiments, additional blocks not shown in FIG. 4 are included in the method 260. For example, in one embodiment, the method 260 also includes a block in which the querying mobile device receives a message from the location provider system (via the first communication network) indicating that the querying mobile device should stop transmitting the location broadcast message.

Figure 5:
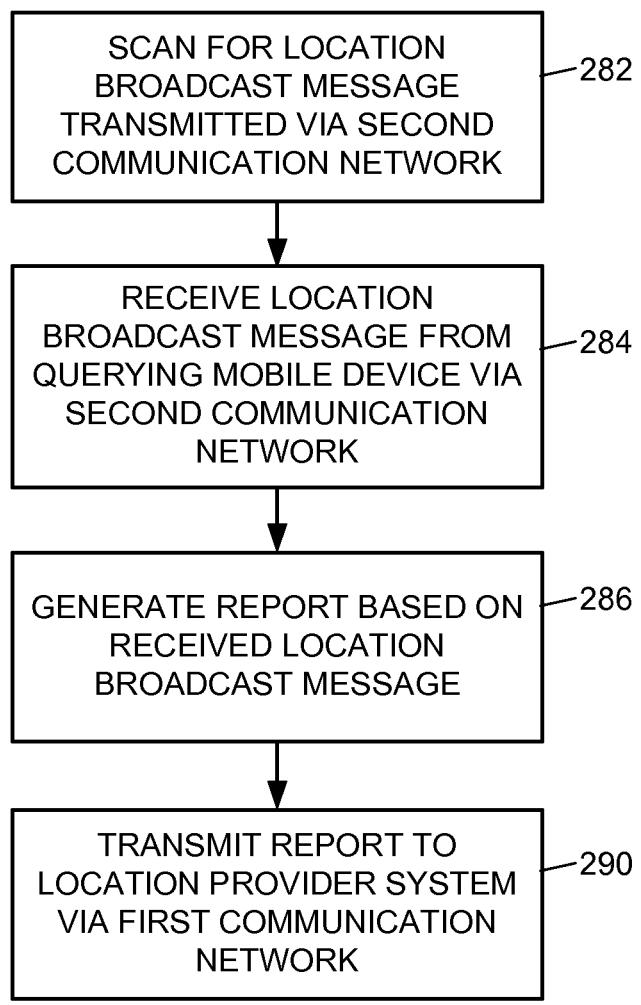
FIG. 5 is a flow diagram of an example method for locating a mobile device using crowdsourcing that may be implemented in a participating mobile device within the example system of FIG. 1.

FIG. 5 is a flow diagram of an example method 280 for locating a mobile device using crowdsourcing that may be implemented in a participating mobile device, such as participating mobile device 140A or 140B in the first example system 100 of FIG. 1. The participating mobile device is capable of operating in at least a first communication network and a second communication network. For example, the participating mobile device may be capable of operating in a first, cellular network and a second, WiFi network.

At block 282, a location broadcast message transmitted via the second communication network is scanned for. In some embodiments, a participating mobile device implementing the method 280 scans for a particular location broadcast message (e.g., a location broadcast message including a particular identifier such as a particular MAC address). The participating mobile device may scan at a particular time specified by a location provider system, for example.

At block 284, a location broadcast message is received from a querying mobile device via the second communication network. The location broadcast message includes an identifier of the querying mobile device. For example, the location broadcast message may include a MAC address associated with the querying mobile device. In one embodiment, the received broadcast message is recognized as a location broadcast message, and/or is recognized as an expected location broadcast message, based on information included in the broadcast message (e.g., the identifier of the querying mobile device, a particular pattern in a data field, etc.). In some implementations, the received location broadcast message is a WiFi beacon.

At block 286, a report based on the location broadcast message received at block 284 is generated. In an embodiment, the report includes a signal strength of the location broadcast message received at block 284. In some embodiments, the report additionally includes an identifier of a participating mobile device implementing the method 280, and/or a location of the participating mobile device (e.g., as determined by a GPS chip in the participating mobile device).

At block 290, the report generated at block 286 is transmitted to a location provider system via the first communication network. The location provider system may then utilize the report, along with any reports received from other participating mobile devices, to determine an estimated location of the querying mobile device.

In some embodiments, additional blocks not shown in FIG. 5 are included in the method 280. For example, in some embodiments, the method 280 includes a block, prior to block 282, in which the participating mobile device receives a request to scan for a location broadcast message from the location provider system via the first communication network. In one of these embodiments, block 282 occurs in response to receiving the request to scan for a location broadcast message.

Figure 6:
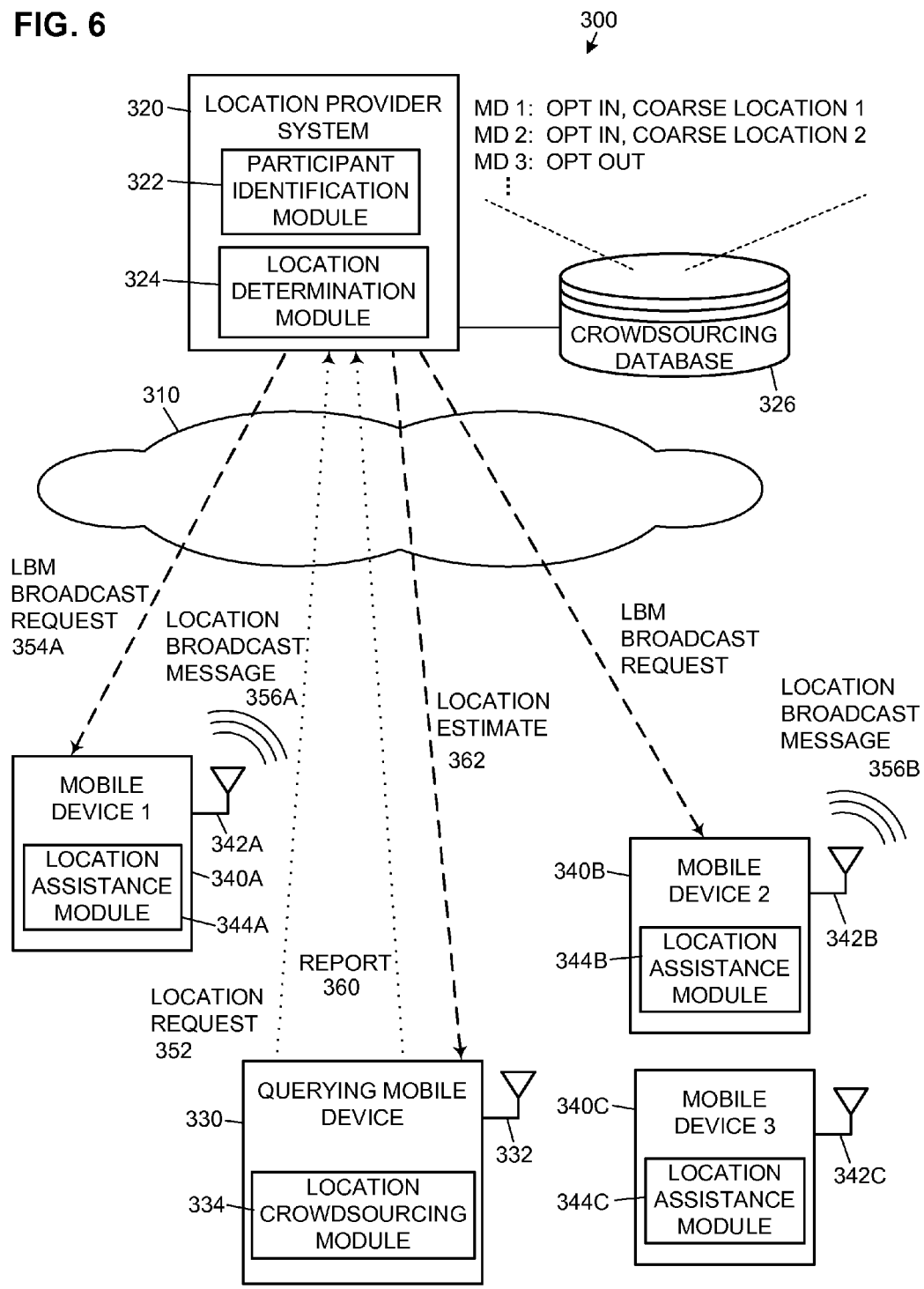
FIG. 6 is a block diagram of an example system that implements another crowdsource locating technique according to which a querying device processes location broadcast messages from certain participating devices to determine the location of the querying device.

FIG. 6 is a block diagram of a second example system 300 in which a second example technique for locating a mobile device using crowdsourcing is applied. In the second example crowdsource locating technique, participating mobile devices (rather than the querying mobile device) transmit a location broadcast message. The system 300 includes a communication network 310. Communication network 310 may be similar to communication network 110 of FIG. 1, for example. A location provider system 320 is coupled to communication network 310. Location provider system 320 may include one or more computing devices (e.g., servers), and may reside at a single location or be distributed across multiple locations. Location provider system 320 includes a participant identification module 322 and a location determination module 324, and is coupled to (or includes) a crowdsourcing database 326, which may be similar to the crowdsourcing database 126 of FIG. 1, for example.

The system 300 also includes a querying mobile device 330 that attempts to determine its location according to the second example crowdsource locating technique of FIG. 6. Querying mobile device 330 includes at least one antenna 332 and a location crowdsourcing module 334. In addition to querying mobile device 330, the system 300 includes a plurality of other mobile devices 340. Each of mobile devices 340 includes at least one antenna 342 and a location assistance module 344. Each of mobile devices 340 may be the same as or different than the other mobile devices 340, and may be the same as or different than querying mobile device 330, according to various embodiments and scenarios.

Querying mobile device 330 and mobile devices 340 are each configured to operate in at least two different wireless communication networks using at least two different communication protocols. A first communication protocol is used for communications over a first communication network, and a second communication protocol is used for communications over a second communication network. In the embodiment shown in FIG. 6, for example, the first communication network may be a cellular network included in communication network 310, and the second communication network may be a shorter range network (e.g., a WiFi network) that includes querying mobile device 330 and mobile devices 340, but not communication network 310. Antenna 332 of querying mobile device 330 and antennas 342 of mobile devices 340 are used for communications in the second communication network. In some embodiments, antennas 332 and/or 342 are also used for communications in the first communication network. In other embodiments, other antennas (not shown) are used for communications in the first communication network. In some embodiments, one or more of querying mobile device 330 and mobile devices 340 are additionally configured to utilize locating services (e.g., GPS) that do not make use of the crowdsource locating techniques described herein.

According to various embodiments, each of the modules illustrated in the second example system 300 (e.g., the participant identification module 322, the location crowdsourcing module 334, etc.) is implemented in hardware, in a processor that executes firmware and/or software instructions, or a combination thereof.

In operation, the location crowdsourcing module 334 of querying mobile device 330 generates a request 352 to determine the location of querying mobile device 330, and causes the request 352 to be transmitted to location provider system 320 via the first (e.g., cellular) communication network. Location provider system 320 may be communicated with as a web-accessible service, for example. The request 352 may be similar to the request 152 of FIGS. 1 and 2, for example. In an embodiment, the request 352 is received by location provider system 320 via the first communication network, and then passed to the participant identification module 322. After receiving the request 352, the participant identification module 322 identifies one or more participating mobile devices that potentially are physically proximate to querying mobile device 330. The identification process may be similar to the identification process described above with respect to FIGS. 1-3, for example.

In the example illustrated in FIG. 6, crowdsourcing database 326 stores information indicating that mobile devices 340A and 340B have an "opt in" status and are therefore "participating" mobile devices, while mobile device 340C has an "opt out" status and is therefore a "non-participating" mobile device. Moreover, crowdsourcing database 326 stores information indicating that participating mobile device 340A is associated with a first coarse location ("coarse location 1") and that mobile device 340B is associated with a second coarse location ("coarse location 2"). For example, each coarse location may be an identification of a cell tower currently serving the respective mobile device 340, and the coarse location may be determined to be potentially proximate to querying mobile device 330 if the device 330 is currently served by the same cell tower (or a tower of a neighboring cell, etc., depending on the criteria used). As another example, each coarse location may be a recent past location of the respective mobile device 340 (e.g., as previously determined by a GPS system of the device, or as previously determined by location provider system 320 using the second example crowdsource locating technique of FIG. 6, etc.), and the coarse location may be determined to be potentially proximate to querying mobile device 330 if the coarse location is within a threshold distance of a cell tower currently serving querying mobile device 330.

After identifying the participating mobile devices 340A and 340B, the participant identification module 322 causes location provider system 320 to transmit requests 354A and 354B to participating mobile devices 340A and 340B, respectively, via the first communication network. Unlike the requests 154 to scan for a location broadcast message that are utilized in the first crowdsource locating technique of FIGS. 1 and 2, each of the requests 354 includes a message requesting that the receiving mobile device broadcast a location broadcast message on a second (e.g., WiFi) communication network. In some embodiments, each of the requests 354 includes an identifier that has been assigned to the receiving mobile device. For example, the request 354A may include a first MAC address that location provider system 320 assigned to participating mobile device 340A as a temporary identifier, and the request 354B may include a different, second MAC address that location provider system 320 assigned to participating mobile device 340B as a temporary identifier. Similar to the first example technique of FIG. 1, each assigned temporary identifier may be suitably random, thereby protecting the privacy of participating mobile devices.

In response to receiving request 354A, the location assistance module 344A of participating mobile device 340A causes a location broadcast message 356A to be transmitted via the second communication network. Similarly, in response to receiving request 354B, the location assistance module 344B of participating mobile device 340B causes a location broadcast message 356B to be transmitted via the second communication network. In an embodiment where the second communication network is a WiFi network, the location assistance modules 344A and 344B automatically configure participating mobile devices 340A and 340B, respectively, as WiFi hotspots in order to send the corresponding location broadcast messages 356A and 356B. The location broadcast messages 356 each include an identifier associated with the respective participating mobile device 340. In an embodiment where each of the requests 354 from location provider system 320 includes an assigned identifier (e.g., an assigned MAC address) as discussed above, each of the location broadcast messages 356 includes the respective identifier. In some implementations, the location broadcast messages 356 are simply beacons that participating mobile devices 340A and 340B automatically broadcast when configured as WiFi hotspots.

In the example embodiment and scenario of FIG. 6, querying mobile device 330 receives the location broadcast messages 356A and 356B from participating mobile devices 340A and 340B via the second communication network (e.g., using a network interface of querying mobile device 330), and passes the location broadcast messages 356 to the location crowdsourcing module 334. After receiving the location broadcast messages 356, the location crowdsourcing module 334 generates a report 360 based on the location broadcast messages 356, and causes the querying mobile device 330 to transmit the report 360 to location provider system 320 via the first communication network. In various embodiments, the report 360 includes an indication of a signal strength (e.g., measured power level) of each location broadcast message 356 as received by querying mobile device 330, and/or includes identifiers of participating mobile devices 340A and 340B (e.g., MAC addresses that were included in the location broadcast messages 356A and 356B). In an alternative embodiment, the location crowdsourcing module 334 generates, and/or causes to be transmitted to the location provider system 320, a separate report for each received location broadcast message 356. Location provider system 320 receives the report(s) 360 from querying mobile device 330, and passes the report(s) 360 to the location determination module 324. After receiving the report(s) 360, the location determination module 324 determines an estimated location 362 of querying mobile device 330 based on the received report(s) 360 and known locations of participating mobile devices 340A and 340B.

In one embodiment, the location determination module 324 retrieves the known locations of participating mobile devices 340A and 340B from a database (e.g., the crowdsourcing database 326). For example, in one embodiment where the report 360 includes identifying information (e.g., MAC addresses) corresponding to participating mobile devices 340A and 340B, the location determination module 324 retrieves the known locations from a database using the identifying information (e.g., as a key to an index in the database).

The location determination module 324 may determine the estimated location 362 in a manner similar to that in which the location determination module 124 of FIG. 1 determines the estimated location 162, for example. Moreover, as with the first example crowdsource locating technique of FIG. 1, fewer or more than two participating mobile devices may contribute to locating the querying mobile device 330 in other scenarios.

Once the estimated location 362 has been determined, the location determination module 324 causes location provider system 320 to transmit the estimated location 362 to querying mobile device 330 via the first communication network, in an embodiment.

Querying mobile device 330 may then receive the estimated location 362 via the first communication network, and pass the estimated location 362 to the location crowdsourcing module 334. After receiving the estimated location 362, the location crowdsourcing module 334 may utilize the estimated location 362 in some manner. For example, the location crowdsourcing module 334 may cause the estimated location 362 to be displayed to a user of querying mobile device 330, shared with another application running on querying mobile device 330, and/or stored in a memory of querying mobile device 330.

Figure 7:
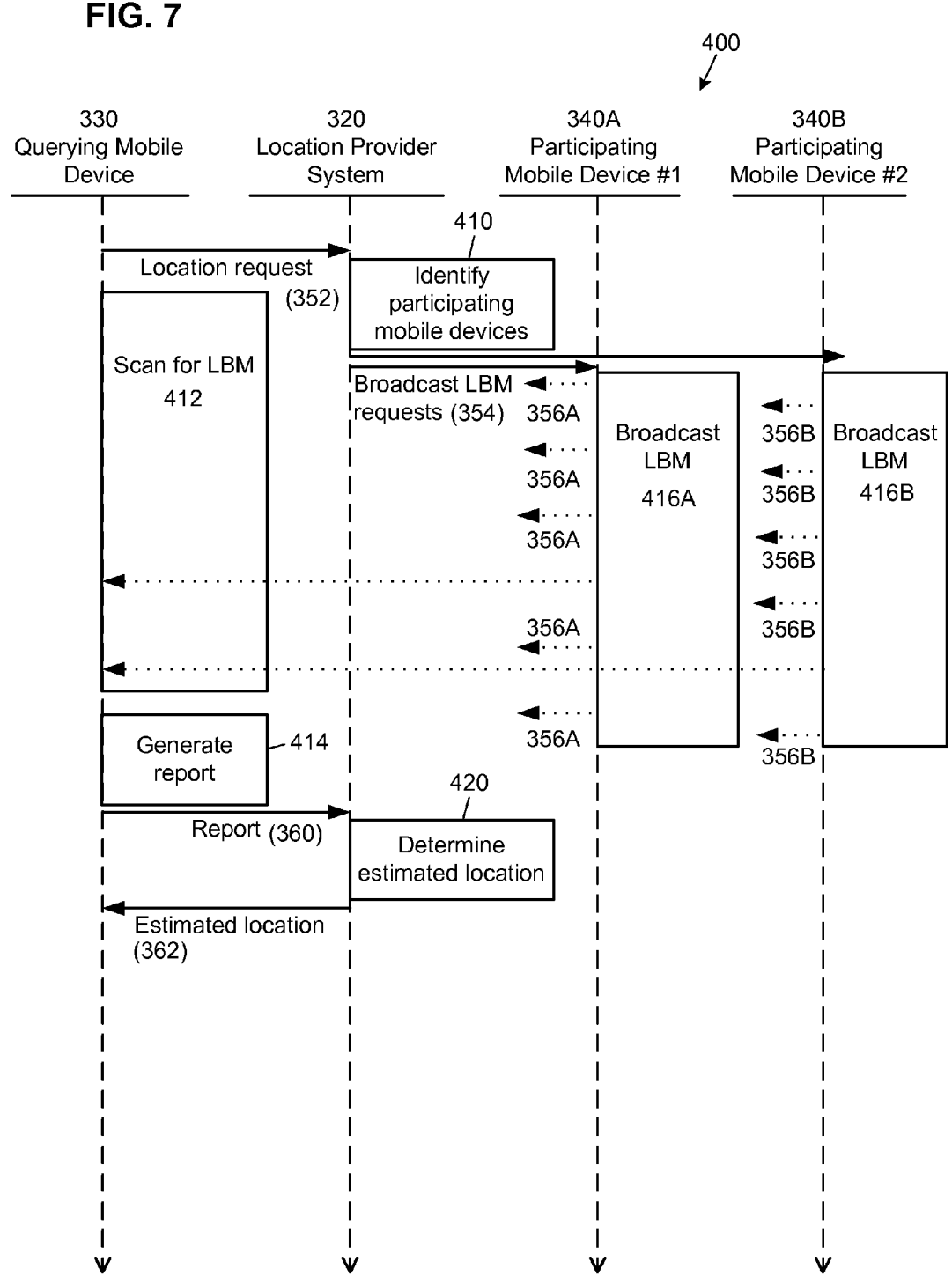
FIG. 7 is a sequence diagram corresponding to the example system and crowdsource locating technique of FIG. 6.

FIG. 7 is a sequence diagram 400 corresponding to the second example system 300 and second example crowdsource locating technique of FIG. 6. The sequence diagram 400 includes a first time-line corresponding to querying mobile device 330 of FIG. 6, a second time-line corresponding to location provider system 320 of FIG. 6, a third time-line corresponding to participating mobile device 340A of FIG. 6, and a fourth time-line corresponding to participating mobile device 340B of FIG. 6. Similar to FIG. 2, solid horizontal lines in FIG. 6 represent communications via a first communication network (e.g., via a cellular network in communication network 310 of FIG. 6), and dotted horizontal lines in FIG. 6 represent communications via a second communication network (e.g., a WiFi network). The sequence diagram 400 is described below with reference to both FIG. 6 and FIG. 7.

Initially, the request 352 is transmitted from querying mobile device 330 to location provider system 320 via the first (e.g., cellular) communication network. Location provider system 320 then (e.g., in response to receiving the request 352) performs a process 410 of identifying participating mobile devices that may be physically proximate to querying mobile device 330. After process 410 is completed, location provider system 320 transmits a request 354 to send a location broadcast message to each of the participating mobile devices identified in process 410. In the scenario of FIGS. 6 and 7, participating mobile devices 340A and 340B are identified by process 410.

After transmitting request 352, querying mobile device 330 begins a scan 412 for location broadcast messages sent via the second communication network. In some embodiments, querying mobile device 330 begins the scan 412 for location broadcast messages after a suitable, predetermined amount of time has expired after transmitting the request 352. To this end, a suitable timeout may be utilized such that location provider system 320 has sufficient time to transmit requests 354 to any participating mobile devices before the scan 412 begins. In other embodiments, querying mobile device 330 does not initiate scan 412 until receiving a message (not shown in FIG. 7) from location provider system 320 indicating that the identification process 410 has been completed and/or requests 354 have been sent.

After receiving a respective one of the requests 354, participating mobile devices 340A and 340B each begin a mode of operation 416 (e.g., operation as a WiFi hotspot) and transmit the location broadcast messages 356A and 356B via the second communication network. In other embodiments and scenarios, one or more of the requests 354 are sent before the process 410 has completed, and/or broadcast modes 416A and 416B do not begin at the same time. For example, in one embodiment and scenario, request 354A is transmitted at a first time when participating mobile device 340A is identified, and request 354B is transmitted at a later, second time when participating mobile device 340B is identified. The broadcast mode 416A may then begin before broadcast mode 416B begins, for example.

The location broadcast messages 356A and 356B may be transmitted periodically, as shown in FIG. 7. In the example scenario shown in FIG. 7, the fourth transmission of location broadcast message 356A is successfully received by querying mobile device 330 and the fifth transmission of location broadcast message 356B is successfully received by querying mobile device 330. In one embodiment, the location broadcast messages 356A and 356B are repeated only a predetermined number of times, or only until a timeout expires. In other embodiments, the location broadcast message 356A is repeated until location provider system 320 transmits a message to participating mobile device 340A indicating that the estimated location 362 has been determined, and the location broadcast message 356B is repeated until location provider system 320 transmits a message to participating mobile device 340B indicating that the estimated location 362 has been determined. In still other embodiments, the location broadcast messages 356A and 356B are repeated until the earlier of 1) receiving a message that the estimated location 362 has been determined and 2) detecting a timeout expiration (or reaching a predetermined number of repetitions). In other embodiments, the location broadcast messages 356A and 356B are sent only once, or are sent repeatedly but in a non-periodic manner.

In an embodiment, scan 412 terminates in response to both location broadcast messages 356 having been received by querying mobile device 330. Querying mobile device 330 may be aware of the expected number of location broadcast messages based on a message received from location provider system 320 via the first communication network, for example. In other embodiments, scan 412 terminates in response to the expiration of a suitable timeout period. In some embodiments, scan 412 terminates in response to the earlier of 1) reception of all expected location broadcast messages and 2) expiration of a suitable timeout period.

After location broadcast messages 356A and 356B have been received by querying mobile device 330, the device 330 generates a report 360 (process 414). Once generated, querying mobile device 330 transmits the report 360 to location provider system 320 via the first communication network. In other embodiments, querying mobile device 330 generates and transmits multiple reports (e.g., one report after each location broadcast message 356 is received).

After receiving the report 360, location provider system 320 determines the estimated location 362 (process 420), and the estimated location 362 is transmitted to querying mobile device 330 via the first communication network.

Figure 8:
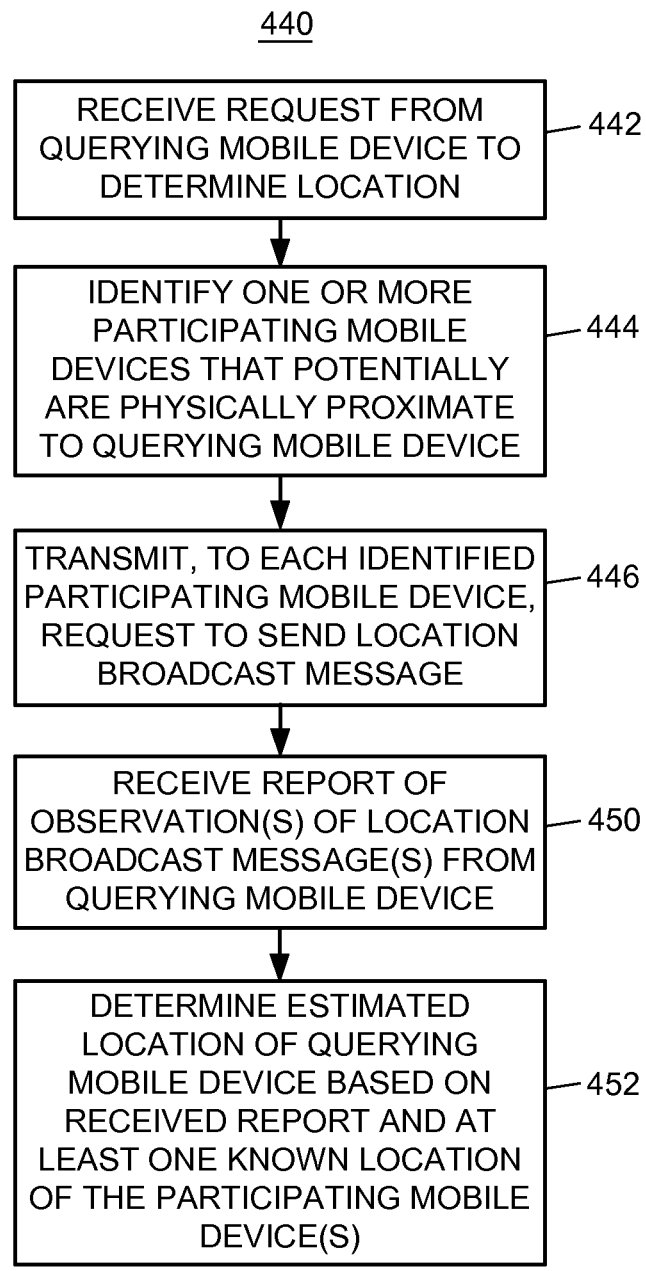
FIG. 8 is a flow diagram of an example method for locating a mobile device using crowdsourcing that may be implemented in a location provider system within the example system of FIG. 6.

FIG. 8 is a flow diagram of an example method 440 for locating a mobile device using crowdsourcing that may be implemented in a location provider system, such as location provider system 320 in the second example system 300 of FIG. 6.

At block 442, a request to determine a location of a querying mobile device is received from the querying mobile device (e.g., querying mobile device 330 in FIG. 1). Block 442 may be similar to block 242 in FIG. 3, for example.

At block 444, one or more participating mobile devices that potentially are physically proximate to the querying mobile device (e.g., participating mobile devices 340A and 340B in FIG. 6) are identified. Block 444 may be similar to block 244 in FIG. 3, for example.

At block 446, a request to send a location broadcast message is transmitted to each participating mobile device that was identified at block 444 as being potentially near to the querying mobile device. The request to send the location broadcast message is transmitted via a communication network such as a cellular network (e.g., the same network over which the request to determine location is received at block 442). In an embodiment, each request to send a location broadcast message includes a temporary identifier (e.g., a temporary MAC address) assigned to the participating mobile device receiving the request.

At block 450, a report of observations of one or more location broadcast messages is received from the querying mobile device that originally sent the location request at block 442. The report is received via a communication network such as a cellular network (e.g., the same network over which the request to determine location is received at block 442 and the request to broadcast is transmitted at block 446). In an embodiment, the report received at block 450 includes information identifying each participating mobile device that sent a location broadcast message received by the querying mobile device (e.g., based on temporary MAC addresses or other identifiers included in the location broadcast messages). In some embodiments, more than one report is received (e.g., one report for each location broadcast message received by the querying mobile device).

At block 452, an estimated location of the querying mobile device is determined based on the report received from the querying mobile device at block 450, and based on known locations corresponding to the participating mobile devices that sent location broadcast messages received by the querying mobile device. In some embodiments, the known locations are retrieved from a database by a location provider system implementing the method 440. The known locations may be retrieved based on identification information (e.g., temporary MAC addresses or other identifiers) associated with participating mobile devices that is included in the report received at block 450, for example. In some embodiments, the estimated location is determined at block 452 by using triangulation or trilateration.

In some embodiments, additional blocks not shown in FIG. 8 are included in the method 440. For example, in one embodiment, the method 440 further includes a block in which the estimated location determined at block 452 is transmitted to the querying mobile device. In this embodiment, the estimated location may be transmitted via a communication network such as a cellular network (e.g., the same network over which the request to determine location is received at block 442, the request to broadcast is transmitted at block 446, and the report is received at block 450). Moreover, in some embodiments, the blocks shown in FIG. 8 do not occur in their entirety in the order shown. For example, in one embodiment, blocks 444 and 446 may occur at least in part simultaneously (e.g., a first request to broadcast may be transmitted to a first participating mobile device before a second participating mobile device has yet been identified, etc.).

Figure 9:
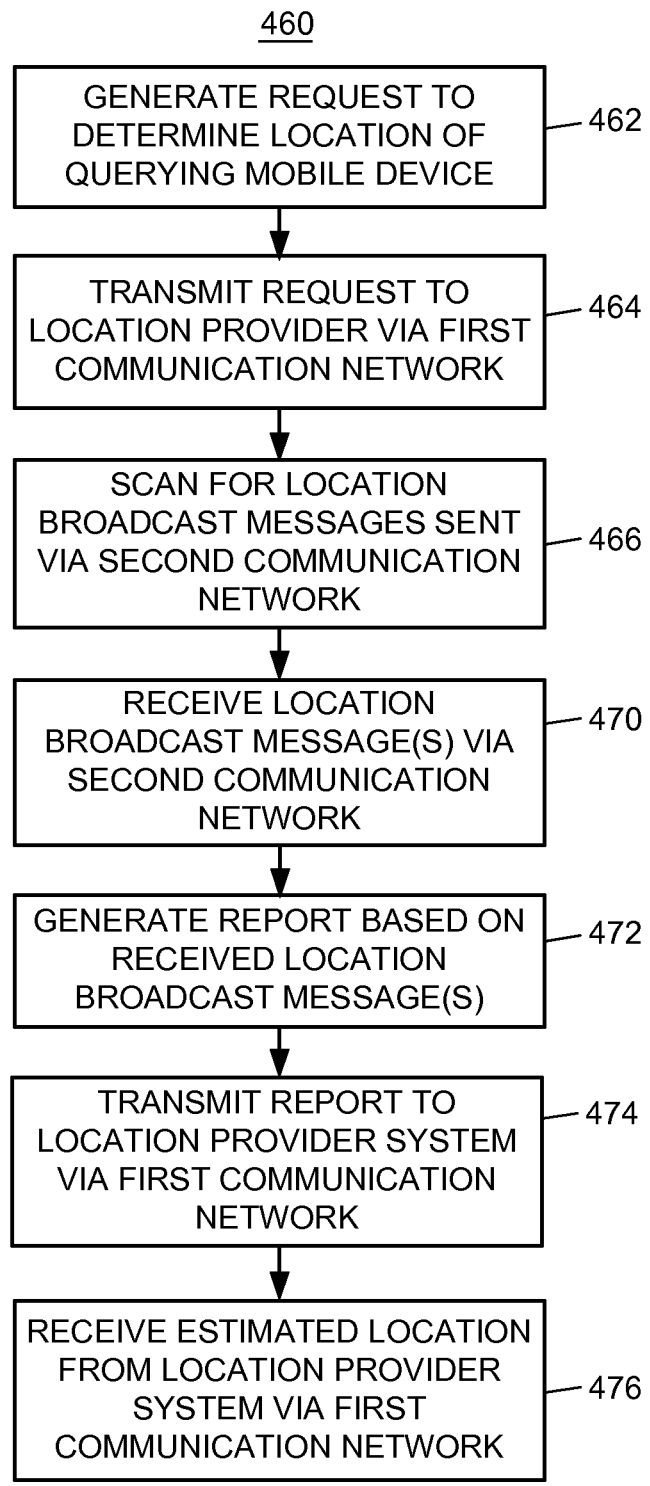
FIG. 9 is a flow diagram of an example method for locating a mobile device using crowdsourcing that may be implemented in a querying mobile device within the example system of FIG. 6.

FIG. 9 is a flow diagram of an example method 460 for locating a mobile device using crowdsourcing that may be implemented in a querying mobile device, such as the querying mobile device 330 in the second example system 300 of FIG. 6. The querying mobile device is capable of operating in at least a first communication network and a second communication network. For example, the querying mobile device may be capable of operating in a first, cellular network and a second, WiFi network.

At block 462, a request to determine a location of the querying mobile device implementing the method 460 is generated. Block 462 may be similar to block 262 of FIG. 4, in an embodiment. At block 464, the request generated at block 462 is transmitted to a location provider system (e.g., location provider system 320 in FIG. 6) via the first communication network.

At block 466, location broadcast messages sent via the second (e.g., WiFi) communication network are scanned for. At block 470, one or more location broadcast messages are received via the second communication network from one or more corresponding participating mobile devices. In one embodiment, broadcast messages are recognized as location broadcast messages based on information included in the messages (e.g., an address within a certain range of addresses, a particular pattern in a data field, etc.). In an embodiment, each received location broadcast message includes a temporary MAC address or other identifier of a participating mobile device that sent the location broadcast message (e.g., a temporary identifier assigned by the location provider system).

At block 472, a report based on the location broadcast messages received at block 470 is generated. In an embodiment, the report includes an indication of a signal strength of each of the location broadcast messages received at block 470. In some embodiments, the report includes temporary identifiers of the participating mobile devices from which location broadcast messages were received (e.g., temporary MAC addresses included in the location broadcast messages), and/or an identifier of a querying mobile device implementing the method 460. In other embodiments, more than one report is generated (e.g., one report for each location broadcast message received by the querying mobile device).

At block 474, the report(s) generated at block 470 is/are transmitted to a location provider system via the first communication network, and at block 476 an estimated location of the querying mobile device is received from the location provider system via the first communication network. The estimated location may be a location determined by the location provider system based on the report(s) received from the querying mobile device, for example.

In some embodiments, additional blocks not shown in FIG. 9 are included in the method 460. For example, in some embodiments, the method 460 includes a block, prior to block 466, in which the querying mobile device receives, from the location provider and via the first communication network, an indication that all potentially proximate participating mobile devices have been identified (and/or indicating that a request to broadcast has been transmitted to each such mobile device). In these embodiments, block 466 may occur in response to receiving the indication from the location provider system, for example.

Moreover, in some embodiments, the blocks shown in FIG. 9 do not occur in their entirety in the order shown. For example, in one embodiment, blocks 466, 470, 472, and/or 474 may occur at least in part simultaneously (e.g., a first location broadcast message may be received, and a first report generated and transmitted, while a querying mobile device implementing the method 460 continues to scan for other location broadcast messages).

Figure 10:
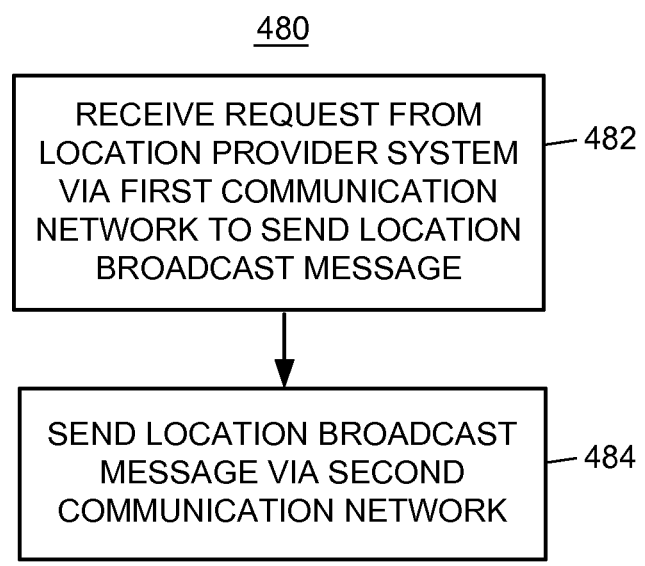
FIG. 10 is a flow diagram of an example method for locating a mobile device using crowdsourcing that may be implemented in a participating mobile device within the example system of FIG. 6.

FIG. 10 is a flow diagram of an example method 480 for locating a mobile device using crowdsourcing that may be implemented in a participating mobile device, such as participating mobile device 340A or 340B in the second example system 300 of FIG. 6. The participating mobile device is capable of operating in at least a first communication network and a second communication network. For example, the participating mobile device may be capable of operating in a first, cellular network and a second, WiFi network.

At block 482, a request to send a location broadcast message is received from a location provider system via the first (e.g., cellular) communication network. In an embodiment, the request includes a temporary identifier (e.g., a temporary MAC address) assigned to the participating mobile device implementing the method 480 by the location provider system.

At block 484, a location broadcast message is sent via the second (e.g., WiFi) communication network. In some embodiments, sending the location broadcast message includes the participating mobile device automatically configuring itself as a WiFi hotspot. In an embodiment, the location broadcast message includes a temporary identifier of the querying mobile device, such as a temporary MAC address included in the request received at block 482. In one embodiment, the location broadcast message is sent repeatedly (e.g., periodically). In another embodiment, the location broadcast message is sent only once.

In some embodiments, additional blocks not shown in FIG. 10 are included in the method 480. For example, in one embodiment, the method 480 also includes a block in which the participating mobile device receives a message from the location provider system via the first communication network indicating that the participating mobile device should stop sending the location broadcast message.

Figure 11:
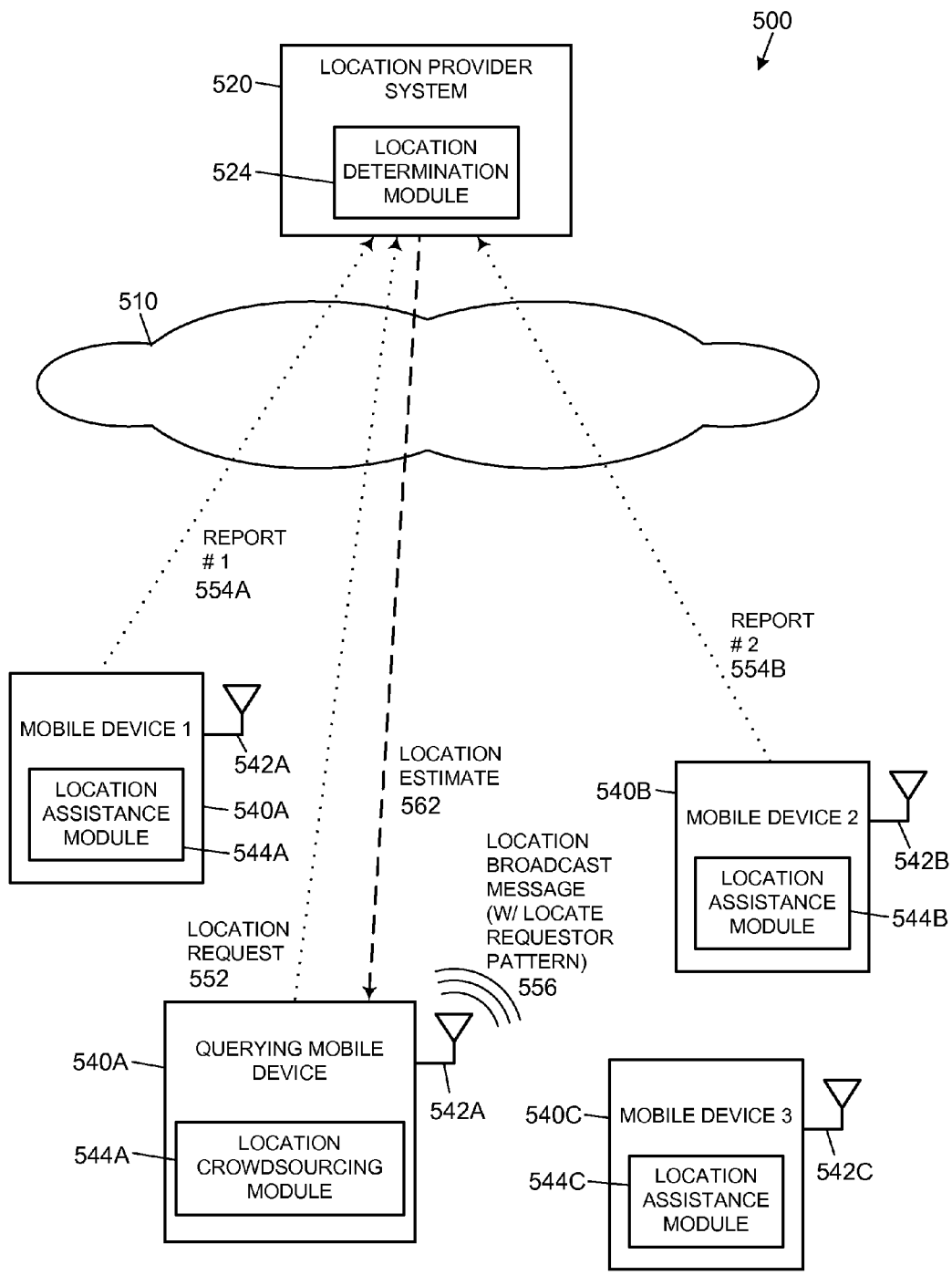
FIG. 11 is a block diagram of an example system that implements another crowdsource locating technique according to which a querying device transmits a location broadcast message, and certain participating devices process the location broadcast message without first being identified.

FIG. 11 is a block diagram of a third example system 500 in which a third example technique for locating a mobile device using crowdsourcing is applied. In the third example crowdsource locating technique, participating mobile devices may be utilized to assist in locating a querying mobile device without first identifying (e.g., via a location provider system) which mobile devices are nearby the querying mobile device. The system 500 includes a communication network 510. Communication network 510 may be similar to communication network 110 of FIG. 1, for example. A location provider system 520 is coupled to communication network 510. Location provider system 520 may include one or more computing devices (e.g., servers), and may reside at a single location or be distributed across multiple locations. Location provider system 520 includes a location determination module 524.

The system 500 also includes a querying mobile device 530 that attempts to determine its own location according to the third example crowdsource locating technique of FIG. 11. Querying mobile device 530 includes at least one antenna 532 and a location crowdsourcing module 534. In addition to querying mobile device 530, the system 500 includes a plurality of other mobile devices 540. Each of mobile devices 540 includes at least one antenna 542 and a location assistance module 544. Each of mobile devices 540 may be the same as or different than the other mobile devices 540, and may be the same as or different than querying mobile device 530, according to various embodiments and scenarios.

Querying mobile device 530 and mobile devices 540 are each configured to operate in at least two different wireless communication networks using at least two different communication protocols. A first communication protocol is used for communications over a first communication network, and a second communication protocol is used for communications over a second communication network. In the embodiment shown in FIG. 11, for example, the first communication network may be a cellular network included in communication network 510, and the second communication network may be a shorter range network (e.g., a WiFi network) that includes querying mobile device 530 and mobile devices 540, but not communication network 510. Antenna 532 of querying mobile device 530 and antennas 542 of mobile devices 540 are used for communications in the second communication network. In some embodiments, antennas 532 and/or 542 are also used for communications in the first communication network. In other embodiments, other antennas (not shown) are used for communications in the first communication network. In some embodiments, one or more of querying mobile device 530 and mobile devices 540 are additionally configured to utilize locating services (e.g., GPS) that do not make use of the crowdsource locating techniques described herein.

According to various embodiments, each of the modules illustrated in the third example system 500 (e.g., the location determination module 524, the location crowdsourcing module 534, etc.) is implemented in hardware, in a processor that executes firmware and/or software instructions, or a combination thereof.

In operation, the location crowdsourcing module 534 of querying mobile device 530 generates a request 552 to determine the location of querying mobile device 530, and causes the request 552 to be transmitted to location provider system 520 via the first (e.g., cellular) communication network. Location provider system 520 may be communicated with as a web-accessible service, for example. In an embodiment, the request 552 includes an identification (e.g., a MAC address) of querying mobile device 530. In an alternative embodiment, request 552 is not generated and/or transmitted by querying mobile device 530.

Whereas the location provider systems 120 and 320 of the first and second example crowdsource locating techniques of FIGS. 1 and 6 identify participating mobile devices that are potentially near to the querying mobile device, and transmit requests to broadcast or requests to scan to the identified devices, location provider system 520 need not identify, or send any requests to, participating mobile devices 540A and 540B. Instead, the location assistance modules 544A and 544B of participating mobile devices 540A and 540B may scan for location broadcast messages transmitted using the second (e.g., WiFi) communication network without waiting for a request from location provider system 520.

The location crowdsourcing module 534 of querying mobile device 530 causes a location broadcast message 556 to be transmitted broadcast via the second communication network using antenna 532. The location broadcast message 556 includes a locate requestor pattern. The locate requestor pattern is a suitable data pattern that indicates that querying mobile device 530 is attempting to be located, and/or identifies the broadcast message 556 as a location broadcast message. In an embodiment, the locate requestor pattern is included in a service set identifier (SSID) field of the location broadcast message 556. In an embodiment, the location broadcast message 556 also includes a separate identifier (e.g., a MAC address) of querying mobile device 530. In other embodiments, the locate requestor pattern itself serves as an identifier of querying mobile device 530.

In the example embodiment and scenario of FIG. 11, participating mobile devices 540A and 540B receive the location broadcast message 556 via the second communication network (e.g., using network interfaces of the participating mobile devices 540A and 540B), and pass the location broadcast message 556 to the location assistance modules 544A and 544B, respectively. After receiving the location broadcast message 556, the location assistance modules 544 may recognize the message 556 as a location broadcast message based on the locate requestor pattern included in the message 556. For example, in an embodiment, the location assistance modules 544 recognize the message 556 as a location broadcast message by matching the locate requestor pattern to a known pattern, or determining that the locate requestor pattern falls within a known range of patterns, etc.

In the example embodiment and scenario of FIG. 11, the mobile device 540C does not have an "opt in" status, and therefore does not participate in location crowdsourcing regardless of whether location broadcast message 556 is detected. In an embodiment, location assistance module 544C does not scan for location broadcast messages unless the status of mobile device 540C changes to an "opt in" status.

Location assistance module 544A generates a report 554A based on the received location broadcast message 556, and causes the participating mobile device 540A to transmit the report 554A to location provider system 520 via the first communication network. In various embodiments, the report 554A includes an indication of a signal strength (e.g., measured power level) of location broadcast message 556 as received by participating mobile device 540A, an identifier (e.g., a MAC address) of participating mobile device 540A, a location of participating mobile device 540A, and/or an identifier of querying mobile device 530 (e.g., a MAC address that was included in the location broadcast message 556). Similarly, location assistance module 544B generates a report 554B based on the received location broadcast message 556, and causes the participating mobile device 540B to transmit the report 554B to location provider system 520 via the first communication network. In various embodiments, the report 554B includes an indication of a signal strength (e.g., measured power level) of location broadcast message 556 as received by participating mobile device 540B, an identifier (e.g., a MAC address) of participating mobile device 540B, a location of participating mobile device 540B, and/or an identifier of querying mobile device 530 (e.g., a MAC address that was included in the location broadcast message 556).

The location determination module 524 of location provider system 520 receives the reports 554A and 554B from participating mobile devices 540A and 540B, respectively. In an embodiment, the reports 554 are received by location provider system 520 via communication network 510, and then passed to the location determination module 524. After receiving the reports 554, the location determination module 524 determines an estimated location 562 of querying mobile device 530 based on the received reports 554 and known locations of participating mobile devices 540A and 540B.

In one embodiment, the location determination module 524 retrieves the known locations of participating mobile devices 540A and 540B from a database (e.g., a database similar to crowdsourcing database 126 of FIG. 1). For example, in one embodiment where the reports 554 include identifying information (e.g., MAC addresses) corresponding to participating mobile devices 540A and 540B, the location determination module 524 retrieves the known locations from a database using the identifying information (e.g., as a key to an index in the database). In another embodiment, the location determination module 524 determines the known locations of participating mobile devices 540A and 540B based directly on information within the reports 554. For example, in one embodiment, each of the reports 554 includes a location of the respective participating mobile device 540A or 540B that was previously determined using the third example crowdsourcing location technique, or using a different locating technique such as GPS.

The location determination module 524 may determine the estimated location 562 in a manner similar to that in which the location determination module 124 of FIG. 1 determines the estimated location 162 of querying mobile device 130, for example. Moreover, as with the first example crowdsource locating technique of FIG. 1, fewer or more than two participating mobile devices may contribute to locating the querying mobile device 530 in other scenarios.

Once the estimated location 562 has been determined, the location determination module 524 causes location provider system 520 to transmit the estimated location 562 to querying mobile device 530 via the first communication network, in an embodiment. In some embodiments, location provider system 520 learns the address of querying mobile device 530 based on information in the location request 552. In other embodiments (e.g., where querying mobile device 530 does not send the request 552), location provider system 520 learns the address of querying mobile device 530 based on information included in one or more of the reports 554 (e.g., if reports 554 include identification information that was obtained from the location broadcast message 556).

Querying mobile device 530 then receive the estimated location 562 from location provider system 520 via the first communication network, and passes the estimated location 562 to the location crowdsourcing module 534. After receiving the estimated location 562, the location crowdsourcing module 534 may utilize the estimated location 562 in some manner. For example, the location crowdsourcing module 534 may cause the estimated location 562 to be displayed to a user of querying mobile device 530, shared with another application running on querying mobile device 530, and/or stored in a memory of querying mobile device 530.

Figure 12:
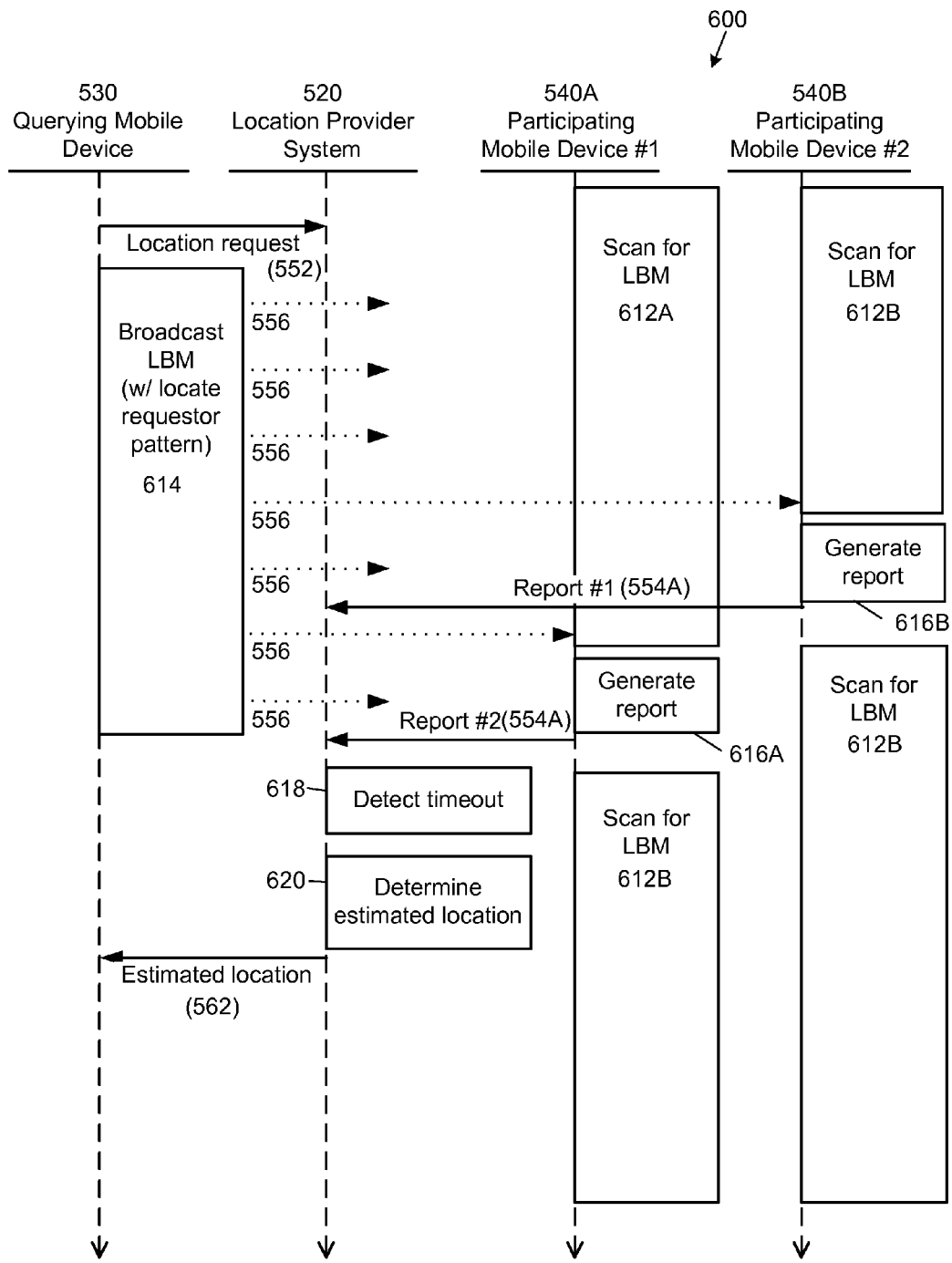
FIG. 12 is a sequence diagram corresponding to the example system and crowdsource locating technique of FIG. 11.

FIG. 12 is a sequence diagram 600 corresponding to the third example system 500 and third example crowdsource locating technique of FIG. 11. The sequence diagram 600 includes a first time-line corresponding to querying mobile device 530 of FIG. 11, a second time-line corresponding to location provider system 520 of FIG. 11, a third time-line corresponding to participating mobile device 540A of FIG. 11, and a fourth time-line corresponding to participating mobile device 540B of FIG. 11. Similar to FIGS. 2 and 6, solid horizontal lines in FIG. 11 represent communications via a first communication network (e.g., via a cellular network in communication network 510 of FIG. 11), and dotted horizontal lines in FIG. 11 represent communications via a second communication network (e.g., a WiFi network). The sequence diagram 600 is described below with reference to both FIG. 11 and FIG. 12.

As seen in FIGS. 11 and 12, the request 552 to determine location is transmitted from querying mobile device 530 to location provider system 520 via the first communication network. As described above, request 552 may not be transmitted by querying mobile device 530 in certain embodiments (e.g., where location provider system 520 instead relies on reports 554 from participating mobile device 540A and 540B to identify a querying mobile device).

Each of participating mobile devices 540A and 540B performs a scan 612A or a scan 612B, respectively, for location broadcast messages sent over the second communication network. In some embodiments, the scans 612 are initiated by the respective participating mobile devices 540A and 540B before the request 552 is transmitted by querying mobile device 530. For example, in one embodiment, scans 612 are continuous scans performed by participating mobile devices 540A and 540B. In another embodiment, scans 612 are performed at regular time intervals that are independent of the request 552.

After transmitting the request 552, querying mobile device 530 begins a mode of operation 614 (e.g., operation as a WiFi hotspot) and transmits the location broadcast message 556 via the second communication network. In some embodiments, querying mobile device 530 begins transmitting location broadcast message 556 in mode 614 after a suitable, predetermined amount of time has expired after transmitting the request 552.

In one embodiment, the location broadcast message 556 is transmitted periodically, as shown in FIG. 12. In the example scenario shown in FIG. 12, the fourth transmission of location broadcast message 556 is successfully received by participating mobile device 540B and the sixth transmission of location broadcast message 556 is successfully received by participating mobile device 540A. In one embodiment, the location broadcast message 556 is repeated only a predetermined number of times, or only until a suitable timeout expires. In other embodiments, the location broadcast message 556 is repeated until querying mobile device 530 receives the estimated location 562 from location provider system 520. In still other embodiments, the location broadcast message 556 is repeated until the earlier of 1) receiving the estimated location 562 and 2) detecting a timeout expiration (or reaching a predetermined number of repetitions). In other embodiments, the location broadcast message 556 is only sent once, or sent repeatedly but in a non-periodic manner.

In an embodiment, each of scans 612 terminates in response to the location broadcast message 556 having been received by the respective participating mobile device 540A or 540B. In some embodiments, each of scans 612 terminates in response to the earlier of 1) reception of the location broadcast message 556 and 2) expiration of a suitable timeout period.

After location broadcast message 556 has been received by participating mobile devices 540A and 540B, the devices 540A and 540B generate reports 554A and 554B (processes 616A and 616B), respectively. Once report 554A is generated, participating mobile device 540A transmits the report 554A to location provider system 520 via the first communication network. Similarly, once report 554B is generated, participating mobile device 540B transmits the report 554B to location provider system 520 via the first communication network. While FIG. 12 shows scans 612A and 612B as being interrupted by processes 616A and 616B, the scans 612A and 612B are not interrupted by processes 616A and 616B in other embodiments After the expiration of a suitable timeout has been detected (process 618), location provider system 520 determines the estimated location 562 (process 620), and the estimated location 562 is transmitted to querying mobile device 530 via the first communication network. In an alternative embodiment, process 618 is omitted from sequence diagram 600. For example, process 618 is omitted in an embodiment where location provider system 520 does not determine the estimated location 562 (at process 620) until all identified participating mobile devices have reported. In another alternative embodiment, location provider system 520 does not determine the estimated location 562 (at process 620) until a threshold number of reports is received.

Figure 13:
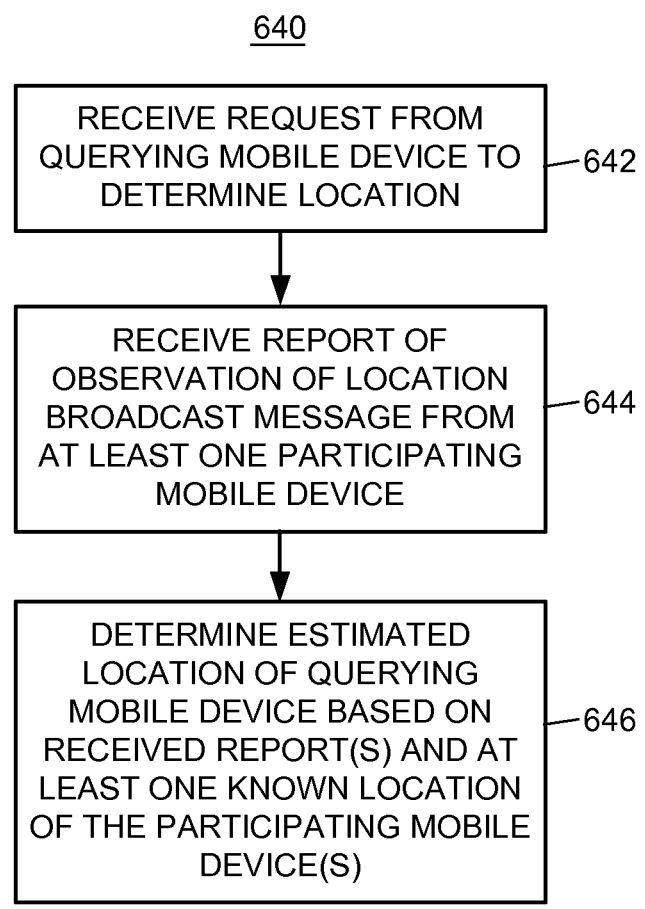
FIG. 13 is a flow diagram of an example method for locating a mobile device using crowdsourcing that may be implemented in a location provider system within the example system of FIG. 11.

FIG. 13 is a flow diagram of an example method 640 for locating a mobile device using crowdsourcing that may be implemented in a location provider system, such as location provider system 520 within the third example system of FIG. 11.

At block 642, a request to determine a location of a querying mobile device is received from the querying mobile device (e.g., querying mobile device 530 in FIG. 11). The request to determine location is received via a communication network such as a cellular network. In an embodiment, the request to determine location includes an identifier (e.g., a MAC address) of the querying mobile device.

At block 644, a report of an observation of a location broadcast message is received from at least one participating mobile device. Block 644 may be similar to block 250 of FIG. 3, for example.

At block 646, an estimated location of the querying mobile device is determined based on the report(s) received from the one or more participating mobile devices at block 644, and based on known locations corresponding to each of those participating mobile devices. Block 646 may be similar to block 252 of FIG. 3, for example.

In some embodiments, additional blocks not shown in FIG. 13 are included in the method 640. For example, in one embodiment, the method 640 further includes a block in which the estimated location determined at block 646 is transmitted to the querying mobile device. In this embodiment, the estimated location may be transmitted via a communication network such as a cellular network (e.g., the same network over which the request to determine location is received at block 642 and the report(s) is/are received at block 644). Moreover, in some embodiments, block 642 is omitted. In these latter embodiments, one or more of the reports received at block 644 may include an identifier (e.g., a MAC address) of the querying mobile device. A location provider system implementing the method 640 may use the identifier of the querying mobile device to determine the intended recipient of the estimated location determined at block 646, for example.

In some scenarios, a location provider system implementing the method 640 may receive reports corresponding to devices that are not actually attempting to request a location. For example, if a particular SSID pattern used to indicate a location request is also (coincidentally) used by another broadcasting device, participating mobile devices may not realize that the transmitting device is not a querying mobile device, and may therefore generate and send reports to the location provider system. In these instances, the location provider system may simply determine that no location request corresponds to the SSID pattern, and discard the report accordingly (or hold the report for a suitable time period while waiting for a corresponding location request, etc.).

Figure 14:
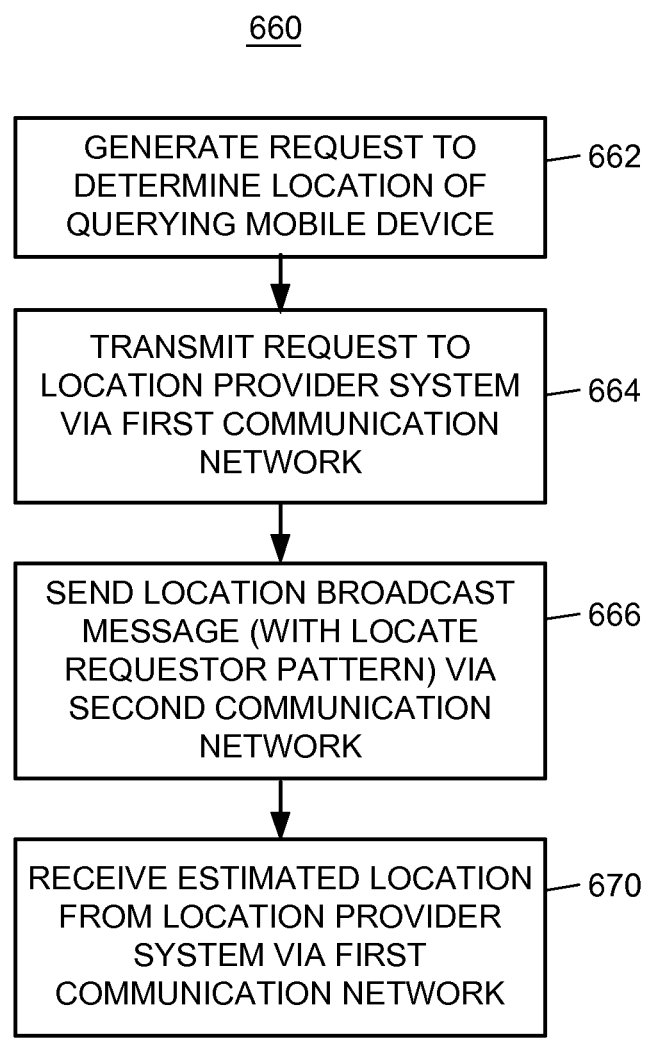
FIG. 14 is a flow diagram of an example method for locating a mobile device using crowdsourcing that may be implemented in a querying mobile device within the example system of FIG. 11.

FIG. 14 is a flow diagram of an example method 660 for locating a mobile device using crowdsourcing that may be implemented in a querying mobile device, such as querying mobile device 530 in the third example system 500 of FIG. 11. The querying mobile device is capable of operating in at least a first communication network and a second communication network. For example, the querying mobile device may be capable of operating in a first, cellular network and a second, WiFi network.

At block 662, a request to determine a location of the querying mobile device implementing the method 660 is generated. In an embodiment, the request to determine location includes an identifier of the querying mobile device. At block 664, the request generated at block 662 is transmitted to a location provider system (e.g., location provider system 120 in FIG. 1) via the first communication network.

At block 666, a location broadcast message is sent via the second communication network. In some embodiments, sending the location broadcast message includes the querying mobile device automatically configuring itself as a WiFi hotspot. The location broadcast message includes a locate requestor pattern indicating that the querying mobile device is attempting to be located, which may be used by participating mobile devices to determine that a report should be generated and transmitted to the location provider system. The locate requestor pattern may be included in an SSID field, for example. Moreover, the location broadcast message may include an identifier (e.g., a MAC address) of the querying mobile device, which participating mobile devices receiving the location broadcast message may then include in the reports sent to the location provider system. In some embodiments, the pattern included in the querying mobile device serves as the identifier of the querying mobile device, and/or vice versa. In one embodiment, the location broadcast message is sent repeatedly (e.g., periodically). In another embodiment, the location broadcast message is sent only once.

At block 670, an estimated location of the querying mobile device is received from the location provider system via the first (e.g., cellular) communication network. In an embodiment, the estimated location is a location determined by the location provider system based on reports from one or more participating mobile devices that received the broadcast message sent at block 666.

In some embodiments, additional blocks not shown in FIG. 14 are included in the method 660. For example, in one embodiment, the method 660 also includes a block in which a querying mobile device implementing the method 660 receives a message from the location provider system via the first communication network indicating that the querying mobile device should stop sending the location broadcast message. Moreover, in some embodiments, blocks 662 and 664 are omitted. In some of these embodiments, the location broadcast message sent at block 666 includes an identifier (e.g., MAC address) of a querying mobile device implementing the method 662, which participating mobile devices receiving the location broadcast message may then include in a report to the location provider system.

Figure 15:
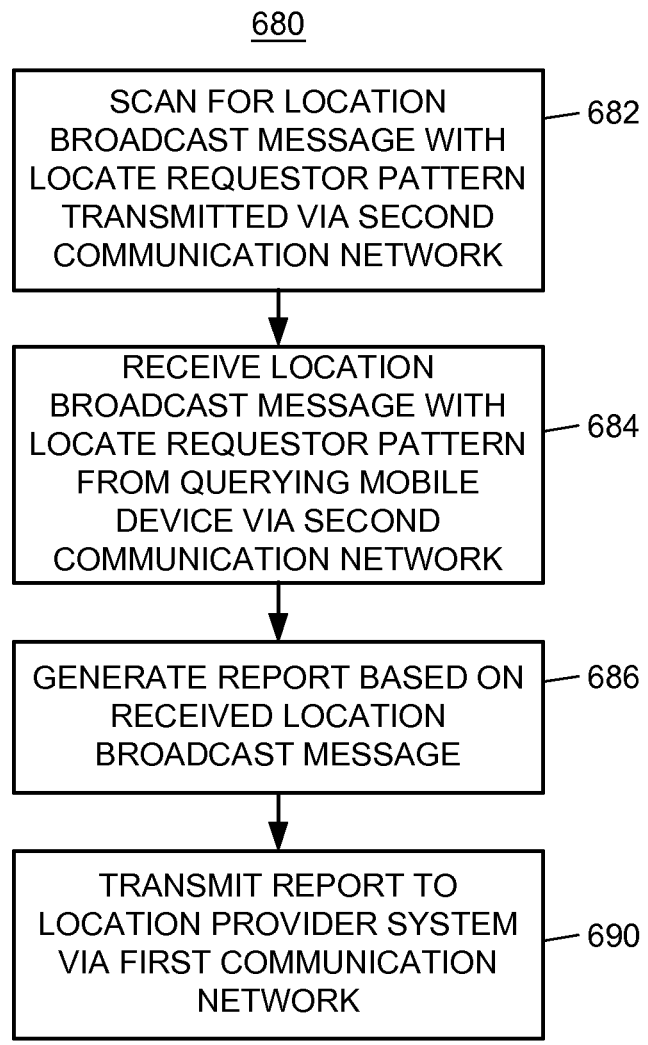
FIG. 15 is a flow diagram of an example method for locating a mobile device using crowdsourcing that may be implemented in a participating mobile device within the example system of FIG. 11.

FIG. 15 is a flow diagram of an example method 680 for locating a mobile device using crowdsourcing that may be implemented in a participating mobile device, such as participating mobile device 540A or 540B in the third example system of FIG. 11. The participating mobile device is capable of operating in at least a first communication network and a second communication network. For example, the participating mobile device may be capable of operating in a first, cellular network and a second, WiFi network.

At block 682, a location broadcast message transmitted via the second communication network is scanned for. More specifically, in an embodiment, a device implementing the method 680 scans for a location broadcast message that includes a particular locate requestor pattern (or one of a particular set of patterns) that indicates that the sending (querying) device is attempting to be located. In some embodiments, the scan at block 682 is a continuous or periodic scan that is initiated autonomously by a participating mobile device implementing the method 680, rather than being initiated in response to a message from a location provider system.

At block 684, a location broadcast message including a locate requestor pattern (e.g., in an SSID field of the location broadcast message) is received from a querying mobile device via the second communication network. In an embodiment, the locate requestor pattern indicates that a querying mobile device from which the location broadcast message is received is attempting to be located. In some embodiments, the locate requestor also serves as an identifier of the querying mobile device. For example, the locate requestor pattern may be one of a particular range of MAC addresses that the device performing the method 680 recognizes as a locate requestor pattern. In other embodiments, the location broadcast message includes an identifier of the querying mobile device in addition to the locate requestor pattern.

At block 686, a report based on the location broadcast message received at block 684 is generated. In an embodiment, the report includes an indication of a signal strength of the location broadcast message as received at block 684. In some embodiments, the report additionally includes an identifier of a participating mobile device implementing the method 680, and/or a location of the participating mobile device (e.g., as determined by a GPS chip in the participating mobile device). In some embodiments in which the location broadcast message received at block 684 included an identifier of a querying mobile device, the report includes that identifier.

At block 690, the report generated at block 686 is transmitted to a location provider system via the first communication network. The location provider system may then utilize the report, along with any reports received from other participating mobile devices, to determine an estimated location of the querying mobile device.

Figure 16:
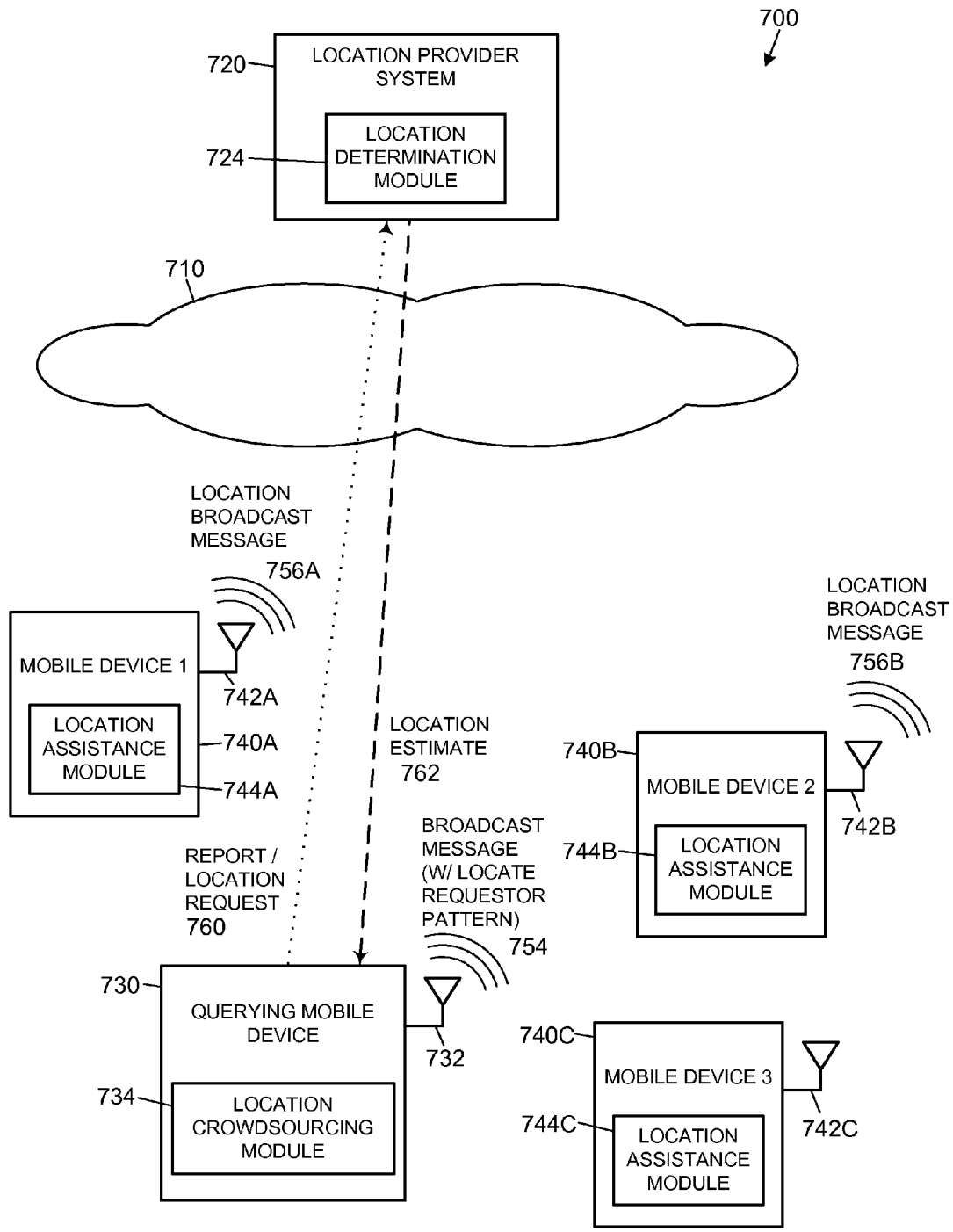
FIG. 16 is a block diagram of an example system that implements another crowdsource locating technique according to which a querying mobile device transmits a request, and certain participating devices transmit a location broadcast message in response to the request.

FIG. 16 is a block diagram of a fourth example system 100 in which a fourth example technique for locating a mobile device using crowdsourcing is applied. According to various embodiments of the fourth example crowdsource locating technique, the third example crowdsource locating technique may be modified by allowing participating mobile devices to transmit location broadcast messages less often, and/or by allowing a querying mobile device to determine its own location without establishing a connection to a location provider system. The system 700 includes a communication network 710. Communication network 710 may be similar to the cellular network 110 of FIG. 1, for example. A location provider system 720 is coupled to communication network 710. Location provider system 720 may include one or more computing devices (e.g., servers), and may reside at a single location or be distributed across multiple locations. Location provider system 720 includes a location determination module 724.

The system 700 also includes a querying mobile device 730 that attempts to determine its own location according to the fourth example crowdsource locating technique of FIG. 16. Querying mobile device 730 includes at least one antenna 732 and a location crowdsourcing module 734. In addition to querying mobile device 730, the system 700 includes a plurality of other mobile devices 740. Each of mobile devices 740 includes at least one antenna 742 and a location assistance module 744. Each of mobile devices 740 may be the same as or different than the other mobile devices 740, and may be the same as or different than querying mobile device 730.

Querying mobile device 730 and mobile devices 740 are each configured to operate in at least two different wireless communication networks using at least two different communication protocols. A first communication protocol is used for communications over a first communication network, and a second communication protocol is used for communications over a second communication network. In the embodiment shown in FIG. 16, for example, the first communication network may be a cellular network included in communication network 710, and the second communication network may be a shorter range network (e.g., a WiFi network) that includes querying mobile device 730 and mobile devices 740, but not communication network 710. Antenna 732 of querying mobile device 730 and antennas 742 of mobile devices 740 are used for communications in the second communication network. In some embodiments, antennas 732 and/or 742 are also used for communications in the first communication network. In other embodiments, other antennas (not shown) are used for communications in the first communication network. In some embodiments, one or more of querying mobile device 730 and mobile devices 740 are configured to utilize locating services (e.g., GPS) that do not make use of the crowdsource locating techniques described herein.

According to various embodiments, each of the modules illustrated in the fourth example system 700 (e.g., the location determination module 724, the location crowdsourcing module 734, etc.) is implemented in hardware, in a processor that executes firmware and/or software instructions, or a combination thereof.

In operation, location crowdsourcing module 734 causes querying mobile device 730 to send a broadcast message 754 over the second (e.g., WiFi) communication network using antenna 732. The broadcast message 754 includes a locate requestor pattern. The locate requestor pattern may be similar to the locate requestor pattern discussed above in connection with FIG. 11, for example.

In the example embodiment and scenario of FIG. 16, participating mobile devices 740A and 740B scan the second communication network (e.g., continuously or periodically) for broadcast messages, and receive the broadcast message 754 via the second communication network (e.g., using network interfaces of the participating mobile devices 740A and 740B). The received broadcast messages are passed to the respective location assistance modules 744A and 744B, which each determine that the message 754 includes the locate requestor pattern. Thereafter (e.g., in response to detecting the locate requestor pattern), location assistance modules 744A and 744B cause participating mobile devices 740A and 740B to send location broadcast messages 756A and 756B, respectively, via the second communication network. In the example embodiment and scenario shown in FIG. 16, mobile device 740C does not have an "opt in" status, and therefore does not participate in location crowdsourcing regardless of whether broadcast message 754 is detected. In an embodiment, location assistance module 744C does not scan for broadcast messages with locate requestor patterns unless the status of mobile device 540C changes to an "opt in" status.

In one embodiment, the location broadcast messages 756A and 756B include information identifying a current location of the respective participating mobile device 740A or 740B. The location information may be encoded in an SSID field, for example. In another embodiment, the location broadcast messages 756A and 756B include information indicating that the respective participating mobile device 740A or 740B has an "opt in" status. In some of these latter embodiments, the information indicating an "opt in" status also serves as an identifier of the respective participating mobile device 740A or 740B. In other of these embodiments, a separate identifier of the respective participating mobile device 740A or 740B is also included in each location broadcast message 756.

In an alternative embodiment, querying mobile device 730 does not transmit broadcast messages 754, and participating mobile devices 740A and 740B do not scan for broadcast messages 754 before sending location broadcast messages 756. In this embodiment, participating mobile devices 740A and 740B may send the respective location broadcast messages 756 without any prompting from querying mobile device 730. For example, participating mobile devices 740A and 740B may periodically send the location broadcast messages 756 so long as participating mobile devices 740A and 740B are powered up and have an "opt in" status.

In the example embodiment and scenario of FIG. 16, querying mobile device 730 receives the location broadcast messages 756 via the second communication network (e.g., using a network interface of the querying mobile device 730) and passes the location broadcast message 756 to the location crowdsourcing module 734. After receiving the location broadcast messages 756, the location crowdsourcing module 734 generates a report 760 based on the received location broadcast messages 756A and 756B, and causes the querying mobile device 730 to transmit the report 760 to location provider system 720 via the first communication network. Location provider system 720 may be communicated with as a web-accessible service, for example. The report 760 may also serve as a request to determine the location of querying mobile device 730. In one embodiment in which the location broadcast messages 756 include locations of the respective participating mobile devices 740, the report 760 includes those locations. In another embodiment, in which the location broadcast messages 756 include information indicating an "opt in" status of the respective participating mobile devices 740, the report 760 includes the information indicating the "opt in" status, and/or separate identifiers of identifying the respective participating mobile devices 740. In an alternative embodiment, the location crowdsourcing module 734 generates, and/or causes to be transmitted to the location provider system 720, a separate report for each received location broadcast message 756.

In an embodiment, the location provider system 720 receives the report(s) 760 via communication network 710, and passes the report(s) to the location determination module 724. After receiving the report(s), the location determination module 724 determines an estimated location 762 of querying mobile device 730 based on the received report(s) 760 and known locations of participating mobile devices 740A and 740B. In an embodiment where the report(s) 760 include(s) locations of participating mobile devices 740A and 740B, those locations may be used as the known locations. In an embodiment where the report(s) 760 instead include(s) information indicating that participating mobile devices 740A and 740B have an "opt in" status and/or separate identifying information, the location determination module 724 may use the status or identifying information to determine the locations of participating mobile devices 740A and 740B. For example, the location determination module 724 may use identifying information in report(s) 760 to cause location provider system 720 to transmit location requests to participating mobile devices 740A and 740B via the first communication network.

The location determination module 724 may determine the estimated location 762 in a manner similar to that in which the location determination module 124 of FIG. 1 determines the estimated location 162, for example. Moreover, as with the first example crowdsource locating technique of FIG. 1, fewer or more than two participating mobile devices may contribute to locating the querying mobile device 730 in other scenarios.

Once the estimated location 762 has been determined, the location determination module 724 causes location provider system 720 to transmit the estimated location 762 to querying mobile device 730 via the first communication network, in an embodiment. Querying mobile device 730 may then receive the estimated location 762 via the first communication network, and pass the estimated location 762 to the location crowdsourcing module 734.

Alternatively, in an embodiment where location broadcast messages 756 include the locations of participating mobile devices 740A or 740B, location crowdsourcing module 734 may determine the estimated location 762 directly, without generating or transmitting report/query 760 and without receiving the estimated location 762 from location provider system 720. In this embodiment, querying mobile device 730 may determine the estimated location 762 in a manner similar to location provider system 120 of FIG. 1 (e.g., using triangulation, etc.).

After receiving (or directly determining) the estimated location 762, the location crowdsourcing module 734 may utilize the estimated location 762 in some manner. For example, the location crowdsourcing module 734 may cause the estimated location 762 to be displayed to a user of querying mobile device 730, shared with another application running on querying mobile device 730, and/or stored in a memory of querying mobile device 730.

Figure 17:
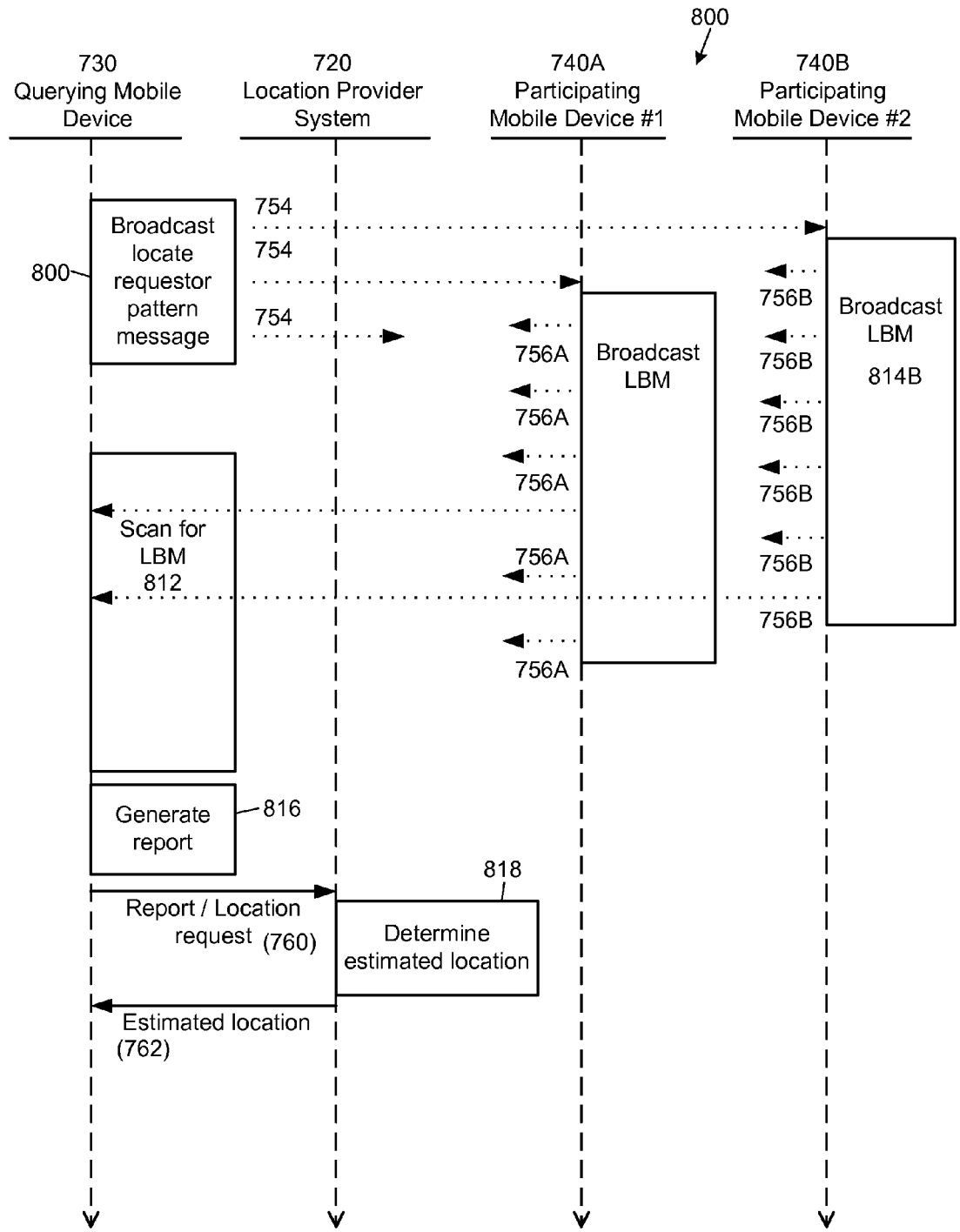
FIG. 17 is a sequence diagram corresponding to the example system and crowdsource locating technique of FIG. 16.

FIG. 17 is a sequence diagram 800 corresponding to the fourth example system 700 and fourth example crowdsource locating technique of FIG. 16. The sequence diagram 800 includes a first time-line corresponding to querying mobile device 730 of FIG. 16, a second time-line corresponding to location provider system 720 of FIG. 16, a third time-line corresponding to participating mobile device 740A of FIG. 16, and a fourth time-line corresponding to participating mobile device 740B of FIG. 16. Again, solid horizontal lines in FIG. 17 represent communications via a first communication network (e.g., via a cellular network in communication network 710 of FIG. 16), and dotted horizontal lines in FIG. 17 represent communications via a second communication network (e.g., a WiFi network). The sequence diagram 800 is described below with reference to both FIG. 16 and FIG. 17.

While in a mode of operation 810 (e.g., operation as a WiFi hotspot), querying mobile device 730 broadcasts a message 754 including a locate requestor pattern via the second communication network. In an embodiment, the broadcast message 754 is transmitted periodically, as shown in FIG. 17. In the example scenario shown in FIG. 17, the first transmission of broadcast message 754 is successfully received by participating mobile device 740B and the second transmission of broadcast message 754 is successfully received by participating mobile device 740A. In one embodiment, the broadcast message 754 is repeated only a predetermined number of times, or only until a suitable timeout expires. In other embodiments, the broadcast message 754 is sent only once, or is sent repeatedly but in a non-periodic manner.

After sending the broadcast message 754, querying mobile device 730 begins a scan 812 for location broadcast messages sent via the second communication network. In some embodiments, querying mobile device 730 begins the scan 812 for location broadcast messages after a suitable, predetermined amount of time has expired since ceasing to broadcast the messages 754. To this end, a suitable timeout may be utilized such that participating mobile devices receiving the message 754 have sufficient time to process the message 754 and begin sending location broadcast messages.

After receiving the broadcast message 754 and detecting the included locate requestor pattern, participating mobile devices 740A and 740B each begin a mode of operation 814 (e.g., operation as a WiFi hotspot) and transmit the location broadcast messages 756A and 756B, respectively, via the second communication network. In an embodiment, mode 814 is entered, and/or a respective location broadcast message 756 is transmitted, in response to detecting the locate requestor pattern in the broadcast message 754. In an embodiment, the location broadcast messages 756A and 756B are transmitted periodically, as shown in FIG. 17. In the example scenario shown in FIG. 17, the fourth transmission of location broadcast message 756A is successfully received by querying mobile device 730 and the sixth transmission of location broadcast message 756B is successfully received by querying mobile device 730. In one embodiment, the location broadcast messages 756A and 756B are repeated only a predetermined number of times, or only until a suitable timeout expires. In other embodiments, the location broadcast message 756A is repeated until location provider system 720 transmits a message to participating mobile device 740A indicating that the estimated location 762 has been determined, and the location broadcast message 756B is repeated until location provider system 720 transmits a message to participating mobile device 740B indicating that the estimated location 762 has been determined. In still other embodiments, the location broadcast messages 756A and 756B are repeated until the earlier of 1) receiving a message that the estimated location 762 has been determined and 2) detecting a timeout expiration (or reaching a predetermined number of repetitions). In other embodiments, the location broadcast messages 756A and 756B are sent only once, or are sent repeatedly but in a non-periodic manner.

In an embodiment, scan 812 terminates in response to a threshold number of location broadcast messages having been received by querying mobile device 730. In other embodiments, scan 812 terminates in response to the expiration of a suitable timeout period. In some embodiments, scan 812 terminates in response to the earlier of 1) reception of a threshold number of location broadcast messages and 2) expiration of a suitable timeout period.

After location broadcast messages 756A and 756B have been received by querying mobile device 730, the device 730 generates a report 760 (process 816). Once generated, querying mobile device 730 transmits the report 760 to location provider system 720 via the first communication network. In an embodiment in which the location broadcast messages 756 each include a location of the respective participating mobile device 740, the report 760 includes those locations. In other embodiments, querying mobile device 730 generates and transmits multiple reports (e.g., one report after each location broadcast message 756 is received).

After receiving the report(s) 760, location provider system 720 determines the estimated location 762 (process 818) based on the report(s) 760, and the estimated location 762 is transmitted to querying mobile device 730 via the first communication network.

In an alternative embodiment in which location provider system 720 is omitted or not utilized, report 760 is not generated (i.e., process 816 does not occur) and/or transmitted by querying mobile device 730. In this embodiment, querying mobile device 730 determines the estimated location 762 (e.g., based on information that otherwise would be included in report 760).

In another alternative embodiment, querying mobile device 730 does not transmit broadcast messages 754 (e.g., does not enter mode 810). In this embodiment, participating mobile devices 740A and 740B may enter modes 814A and 814B, respectively, without any prompting from querying mobile device 730. In this embodiment, modes 814A and 814B may continue, or repeat (e.g., periodically), indefinitely while participating mobile devices 740 are powered up and have an "opted in" status, for example.

Figure 18:
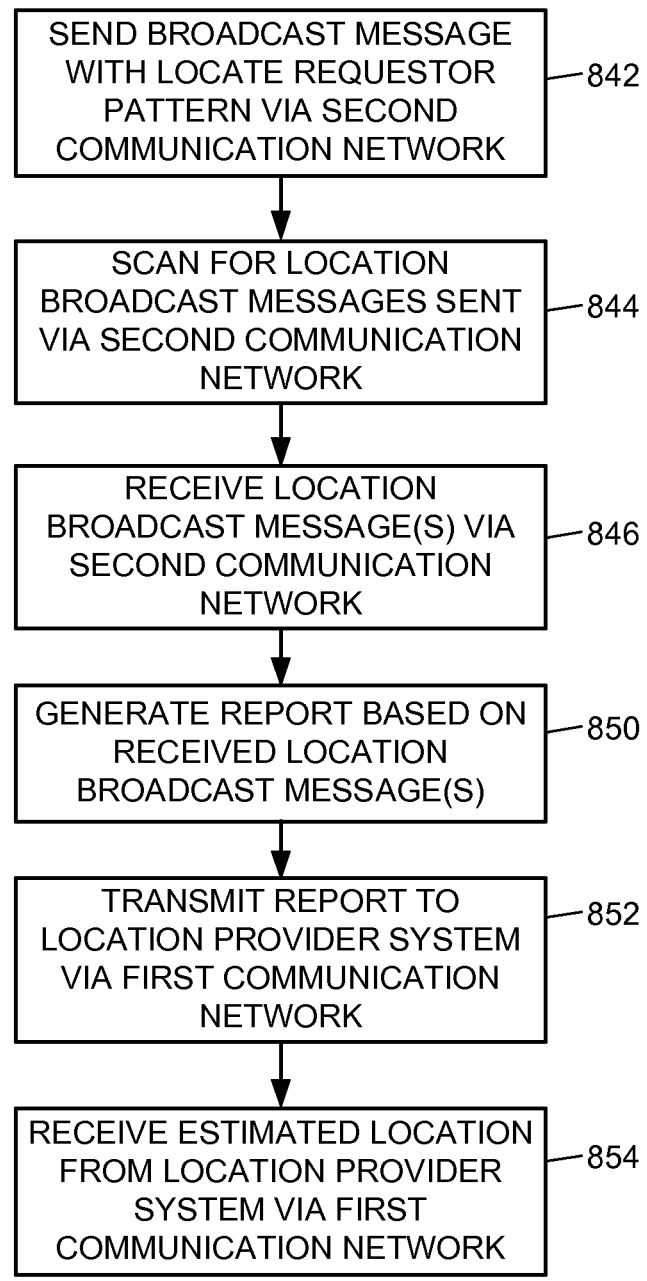
FIG. 18 is a flow diagram of an example method for locating a mobile device using crowdsourcing that may be implemented in a querying mobile device within the example system of FIG. 16.

FIG. 18 is a flow diagram of an example method 840 for locating a mobile device using crowdsourcing that may be implemented in a querying mobile device, such as querying mobile device 730 in the fourth example system 700 of FIG. 16. The querying mobile device is capable of operating in at least a first communication network and a second communication network. For example, the querying mobile device may be capable of operating in a first, cellular network and a second, WiFi network.

At block 842, a broadcast message that includes a locate requestor pattern is sent via the second communication network. The locate requestor pattern may be similar to the locate requestor pattern discussed above in connection with block 684 of FIG. 15, for example.

At block 844, location broadcast messages sent via the second (e.g., WiFi) communication network are scanned for. Block 844 may be similar to block 466 of FIG. 9, for example.

At block 846, one or more location broadcast messages are received via the second communication network. The location broadcast message(s) may be received from each of one or more participating mobile devices, such as participating mobile devices 740A and 740B of FIG. 16, for example. In one embodiment, the received location broadcast messages include information identifying a current location of the respective participating mobile devices that sent the location broadcast messages. The location information may be encoded in an SSID field, for example. In another embodiment, the received location broadcast messages include information indicating that the participating mobile devices that sent the messages have an "opt in" status. In some of these latter embodiments, the information indicating an "opt in" status also serves as an identifier of the respective participating mobile device. In other of these embodiments, a separate identifier of the respective participating mobile device is also included in the received location broadcast message.

At block 850, a report based on the location broadcast message(s) received at block 846 is generated. In an embodiment, the report includes information, derived from the location broadcast messages received at block 846, identifying current locations of each of the participating mobile devices from which the querying mobile device received a location broadcast message. In another embodiment, the report includes information, derived from the location broadcast messages received at block 846, indicating that each of the participating mobile devices from which the querying mobile device received a location broadcast message has an "opt in" status (and, in some embodiments, a separate identifier of each participating mobile device). In other embodiments, more than one report is generated (e.g., one report for each location broadcast message received by the querying mobile device).

At block 852, the report(s) generated at block 850 is/are transmitted to a location provider system via the first communication network. The report may also serve as a request to locate a querying mobile device performing the method 840, and may include an identifier of the querying mobile device.

At block 854 an estimated location of the querying mobile device is received from the location provider system via the first communication network. The estimated location may be a location determined by a location provider system based on the report(s) received from the querying mobile device, for example.

In an alternative embodiment, block 842 is omitted from method 840. In this embodiment, participating mobile devices do not wait to detect a broadcast message with a locate requestor pattern before transmitting the location broadcast message. In another alternative embodiment, blocks 850, 852, and 854 are omitted from method 840. For example, a querying mobile device performing the method 840 may determine the estimated location without assistance from a location provider system. In this embodiment, method 840 may include an additional block (e.g., after, or in part simultaneously with, block 846) in which the estimated location is determined.

Moreover, in some embodiments, the blocks shown in FIG. 18 do not occur in their entirety in the order shown. For example, in one embodiment, blocks 844, 846, 850, and/or 852 may occur at least in part simultaneously (e.g., a first location broadcast message may be received, and a first report generated and transmitted, while a querying mobile device implementing the method 840 continues to scan for other location broadcast messages).

Figure 19:
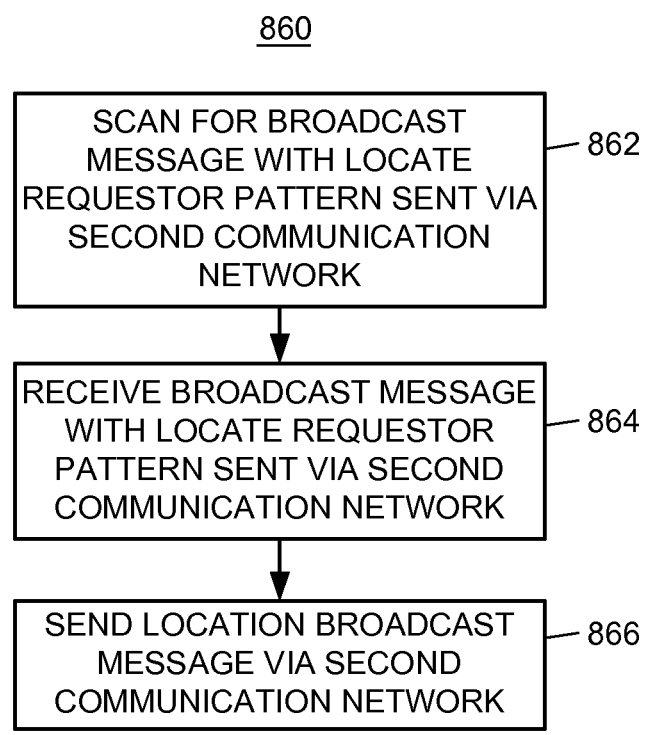
FIG. 19 is a flow diagram of an example method for locating a mobile device using crowdsourcing that may be implemented in a participating mobile device within the example system of FIG. 16.

FIG. 19 is a flow diagram of an example method 860 for locating a mobile device using crowdsourcing that may be implemented in a participating mobile device such as participating mobile device 740A or 740B in the fourth example system 700 of FIG. 16. The participating mobile device is capable of operating in at least a first communication network and a second communication network. For example, the participating mobile device may be capable of operating in a first, cellular network and a second, WiFi network.

At block 862, a broadcast message transmitted via the second communication network is scanned for. More specifically, in an embodiment, a device implementing the method 860 scans for a broadcast message that includes a particular locate requestor pattern (or one of a particular set of patterns) that indicates that the transmitting (querying) device is attempting to be located. In some embodiments, the scan at block 862 is a continuous or periodic scan that is initiated autonomously by a participating mobile device implementing the method 860, rather than being initiated in response to a message from a location provider system.

At block 864, a broadcast message including a locate requestor pattern is received from a querying mobile device via the second communication network. The locate requestor pattern may be similar to the locate requestor pattern discussed above in connection with block 684 of FIG. 15, for example.

At block 866, a location broadcast message is sent via the second communication network. In an embodiment, the location broadcast message includes a location of a participating mobile device performing the method 860. For example, the location broadcast message may include a location determined by a GPS system included in the participating mobile device. In another embodiment, the location broadcast message includes information indicating that a participating mobile device performing the method 860 has an "opt in" status. In one embodiment, the information indicating the "opt in" status also serves as an identifier of the participating mobile device. In another embodiment, an additional identifier of the participating mobile device is included in the location broadcast message.

In one embodiment, block 862 is omitted from the method 860. Moreover, in some embodiments, the method 860 includes additional blocks not shown in FIG. 19. In one embodiment, for example, the method 860 includes an additional block in which a message is received from a location provider system via the first communication network (e.g., after the location provider system has learned the identities of participating mobile devices based on one or more reports received from a querying mobile device). The message may include information indicating that a participating mobile device performing the method 860 may cease transmission of the location broadcast message sent at block 866, for example. As another example, the message may include a request for a current location of a participating mobile device performing the method 860 (e.g., to assist in determining an estimated location of the querying mobile device).

While the embodiments described above in connection with FIGS. 1-19 generally utilize two types of communication networks (e.g., a cellular network and a WiFi network), other implementations may utilize only a single type of communication network, or more than two types of communication networks. As one example, referring back to FIG. 1, participating mobile device 140A may receive the scan request 154A (and/or send the report 160A) via a cellular network, while participating mobile device 140B receives the scan request 154B (and/or sends the report 160) via a WiFi network. Additionally (or alternatively), any other suitable wireless or wired network may be utilized by participating mobile devices (e.g., Bluetooth, etc.). As another example, also referring back to FIG. 1, all of the communications shown (e.g., query 152, scan requests 154, location broadcast message 156, and/or reports 160) may be transmitted over a single type of communication network (e.g., WiFi). In some of these latter implementations, querying and/or participating mobile devices need not be configured to operate according to multiple communication protocols.

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," or "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for crowdsourcing location through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for automatically determining location of a querying mobile device, wherein the querying mobile device and a plurality of mobile devices operate in a communication network, the method comprising:
    electronically receiving, via the communication network, a request from the querying mobile device to determine a location of the querying mobile device;
    assigning a temporary identifier to the querying mobile device;
    automatically identifying, from among the plurality of mobile devices, one or more participating mobile devices that potentially are physically proximate to the querying mobile device, wherein the participating mobile devices are configured to participate in determining location of the querying mobile device;
    electronically transmitting, to the one or more participating mobile devices via the communication network, a request to scan for a location broadcast message transmitted by the querying mobile device, wherein the location broadcast message includes the temporary identifier and does not indicate permanent identity of the querying mobile device;
    electronically receiving one or more location broadcast reports from the one or more participating mobile devices, wherein each received location broadcast report is indicative of the location broadcast message having been received at a corresponding participating mobile device;
    receiving the temporary identifier in each of the one or more location broadcast reports; and
    automatically estimating the location of the querying mobile device based on (i) the received one or more location broadcast reports and (ii) respective locations of the participating mobile devices from which the one or more location broadcast reports were received.

2. The method of claim 1, further comprising assigning a random value to the temporary identifier in response to receiving the request from the querying mobile device.

3. The method of claim 1, wherein
    the request from the querying mobile device includes a coarse location estimate of the querying mobile device, and
    identifying the one or more participating mobile devices that potentially are physically proximate to the querying mobile device includes:
        accessing coarse location estimates of the one or more participating mobile devices electronically stored in a database, and
        comparing the coarse location estimates of the one or more participating mobile devices to the coarse location estimate of the querying mobile device.

4. The method of claim 1, wherein automatically identifying the one or more participating mobile devices includes retrieving, for each identified participating mobile device, a respective electronic configuration record that indicates that a user selected an option to participate in locating querying mobile devices.

5. The method of claim 4, wherein automatically identifying the one or more participating mobile devices further includes determining one of:

(i) whether the querying mobile device and the one or more participating mobile devices are associated with a common organization,
(ii) whether the querying mobile device and the one or more participating mobile devices are associated with a common group specified in a social network,
(iii) whether an estimated location of a respective participating mobile device is within a particular geographic area,
(iv) whether a time at which the request from the querying mobile device is received is within a particular time range,
(v) whether a battery of the respective participating mobile device is depleted below a particular level, and
(vi) whether the respective participating mobile device is otherwise occupied.

6. The method of claim 1, further comprising:
receiving mobile device identification information in the received one or more location broadcast reports; and
retrieving the locations of the participating mobile devices from an electronic database based on the received mobile device identification information.

7. The method of claim 1, wherein automatically estimating the location of the querying mobile device includes using triangulation or trilateration to determine the estimated location.

8. The method of claim 1, further comprising:
electronically transmitting the estimated location to the querying mobile device via the communication network.

9. A location provider system configured to couple to a communication network in which a querying mobile device and a plurality of participating mobile devices operate, the location provider system comprising:
a participant identification module configured to:
receive a request from the querying mobile device to determine a location of the querying mobile device,
assign a temporary identifier to the querying mobile device,
identify one or more of the plurality of participating mobile devices that potentially are physically proximate to the querying mobile device, and
send, to each of the one or more participating mobile devices via the communication network, a request to scan for a location broadcast message, wherein the location broadcast message includes the temporary identifier and does not indicate permanent identity of the querying mobile device; and
a location determination module configured to:
receive one or more location broadcast reports from the one or more participating mobile devices, wherein each received location broadcast report is indicative of the location broadcast message having been received at a corresponding participating mobile device,
receive the temporary identifier in each of the one or more location broadcast reports, and
estimate a location of the querying mobile device based on the received one or more location broadcast reports and on respective locations of the participating mobile devices from which the one or more location broadcast reports were received.

10. The location provider system of claim 9, wherein:
the request from the querying mobile device includes a coarse location estimate of the querying mobile device, and
to identify the one or more participating mobile devices that potentially are physically proximate to the querying mobile device, the participant identification module is configured to (i) access coarse location estimates of the participating mobile devices stored in a database, and (ii) compare the coarse location estimates of the participating mobile devices to the coarse location estimate of the querying mobile device.

11. The location provider system of claim 9, further comprising a plurality of electronic configuration records stored on a computer-readable medium, wherein each of the plurality of configuration records corresponds to a respective one of the plurality of participating mobile devices, and wherein each of the plurality of electronic configuration records indicates that a user associated with the participating mobile device selected an option to participate in locating querying mobile devices.

12. A method in a mobile device for determining location of the mobile device, wherein the mobile device is configured to operate in a first communication network and a second communication network, the method comprising:
generating a request to determine a location of the mobile device;
transmitting the request to a location provider system via the first communication network;
receiving a temporary identifier from the location provider system, wherein the temporary identifier does not reveal permanent identity of the mobile device;
transmitting a location broadcast message via the second communication network, wherein the location broadcast message includes the temporary identifier; and
in response to the transmitted location broadcast message, receiving, from the location provider system via the first communication network, an estimated location of the mobile device, wherein the estimated location is based on locations of devices in the second communication network that received the location broadcast message.

13. The method of claim 12, wherein:
the first communication network is a cellular communication network and the second communication network is a wireless local area network (WLAN), and
the method further comprises automatically configuring the mobile device as a WLAN hotspot before transmitting the location broadcast message.

14. The method of claim 12, wherein the location broadcast message includes a predefined pattern indicating that the mobile device is attempting to be located.

15. A method in a mobile device for assisting in determining a location of a querying mobile device, wherein the mobile device is configured to operate in a first communication network and a second communication network, the method comprising:
scanning for location broadcast messages transmitted via the second communication network;
receiving a location broadcast message from a querying mobile device via the second communication network, wherein the location broadcast message includes a temporary identifier of the querying mobile device, wherein the temporary identifier is assigned by a location provider system, and wherein the temporary identifier does not reveal permanent identity of the querying mobile device;
in response to receiving the location broadcast message, generating a location broadcast report corresponding to the received location broadcast message; and
transmitting the location broadcast report to the location provider system via the first communication network for determining the location of the querying mobile device.

16. The method of claim 15, wherein scanning for location broadcast messages is in response to receiving, from the location provider system via the first communication network, a request to scan for location broadcast messages.

17. The method of claim 15, further comprising providing a location of the mobile device in the location broadcast report.

18. The method of claim 15, further comprising providing an indication of a signal strength of the location broadcast message received by the mobile device.

* * * * *